United States Patent
Parkinson

(10) Patent No.: US 6,782,766 B2
(45) Date of Patent: Aug. 31, 2004

(54) APPARATUS FOR DETECTING TORQUE, AXIAL POSITION AND AXIAL ALIGNMENT OF A ROTATING SHAFT

(75) Inventor: James R. Parkinson, Addison, VT (US)

(73) Assignee: GasTOPS Ltd., Ottawa (CA)

(\*) Notice: Subject to any disclaimer, the term of this patent is extended or adjusted under 35 U.S.C. 154(b) by 108 days.

(21) Appl. No.: 10/242,613

(22) Filed: Sep. 13, 2002

(65) Prior Publication Data

US 2004/0050178 A1 Mar. 18, 2004

(51) Int. Cl.$^7$ .................................................. G01L 3/02
(52) U.S. Cl. ............................ 73/862.329; 73/862.328
(58) Field of Search ..................... 73/862.325, 862.326, 73/862.327, 862.328, 862.329

(56) References Cited

U.S. PATENT DOCUMENTS

| | | | |
|---|---|---|---|
| 3,548,649 A | 12/1970 | Parkinson | |
| 3,940,979 A | \* 3/1976 | Ward et al. | 73/862.324 |
| 4,784,002 A | \* 11/1988 | Io | 73/862.331 |
| 5,508,609 A | 4/1996 | Parkinson et al. | |
| 5,734,108 A | 3/1998 | Walker et al. | |
| 5,969,269 A | 10/1999 | Munyon et al. | |
| 6,295,879 B1 | \* 10/2001 | Miller et al. | 73/862.08 |

FOREIGN PATENT DOCUMENTS

WO   WO 99/05493   2/1999

OTHER PUBLICATIONS

Patent Abstracts of Japan, JP 10–089241, Sep. 28, 1999.

\* cited by examiner

Primary Examiner—Max Noori
(74) Attorney, Agent, or Firm—Oblon, Spivak, McClelland, Maier & Neustadt, P.C.

(57) ABSTRACT

The present invention is an apparatus for obtaining an indication of torque, axial alignment and axial location for a shaft rotating about an axis of rotation. A first set of detectable elements are operably connected to the shaft and positioned parallel to the axis of rotation. A second set of detectable elements parallel to the axis of rotation are interlaced in a sensing plane with said first set of detectable elements. The second set of detectable elements have a variable relative position with respect to the first set of detectable elements. A third set of detectable elements are positioned laterally to the first set of detectable elements and the second set of detectable elements in an alignment plane parallel to the sensing plane. The third set of detectable elements are positioned at an offset angle to the axis of rotation. A plurality of sensors are positioned to detect passage of the first set of detectable elements, the second set of detectable elements and the third set of detectable elements, with each of the sensors producing a signal in response to detection of detectable elements. Relationships for signals produced from detection of the first, second and third sets of detectable elements with respect to a reference signal produced by detection of detectable elements in a plane separate from the alignment plane provides an indication of torque, axial alignment and axial location.

21 Claims, 14 Drawing Sheets

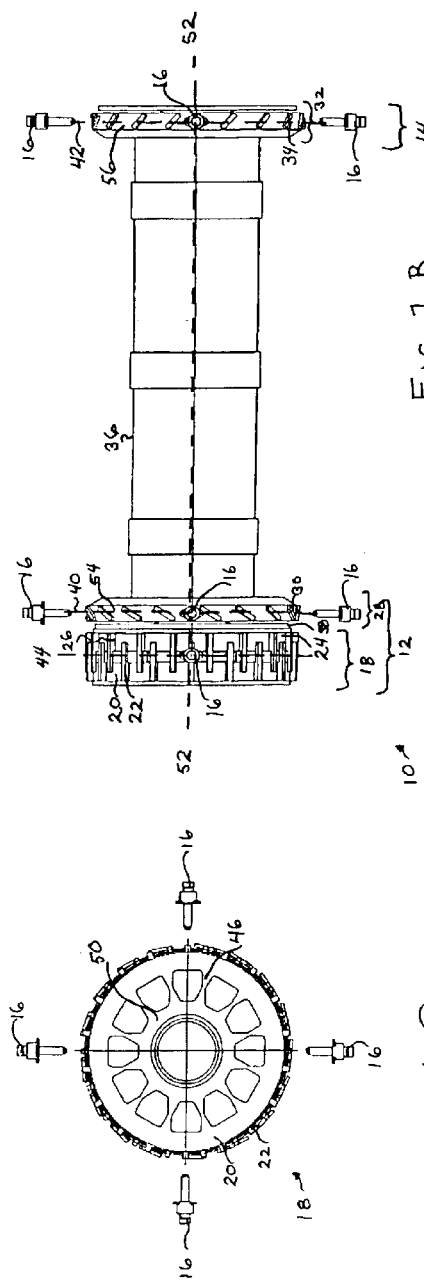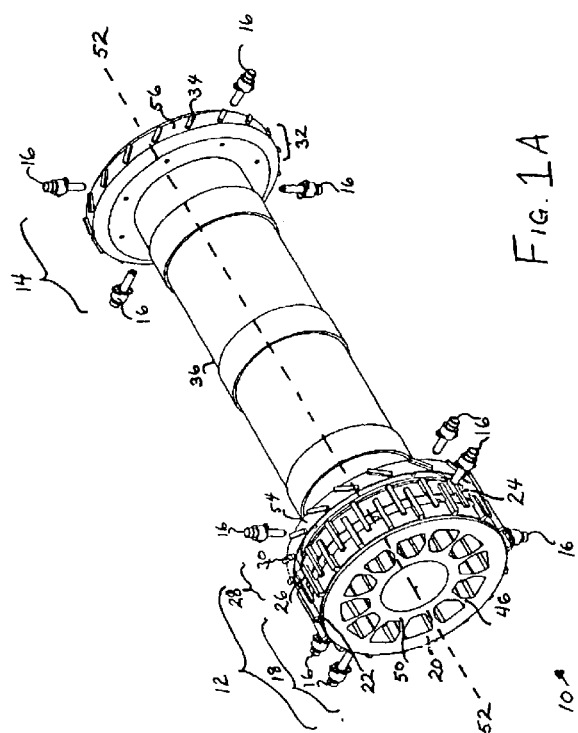

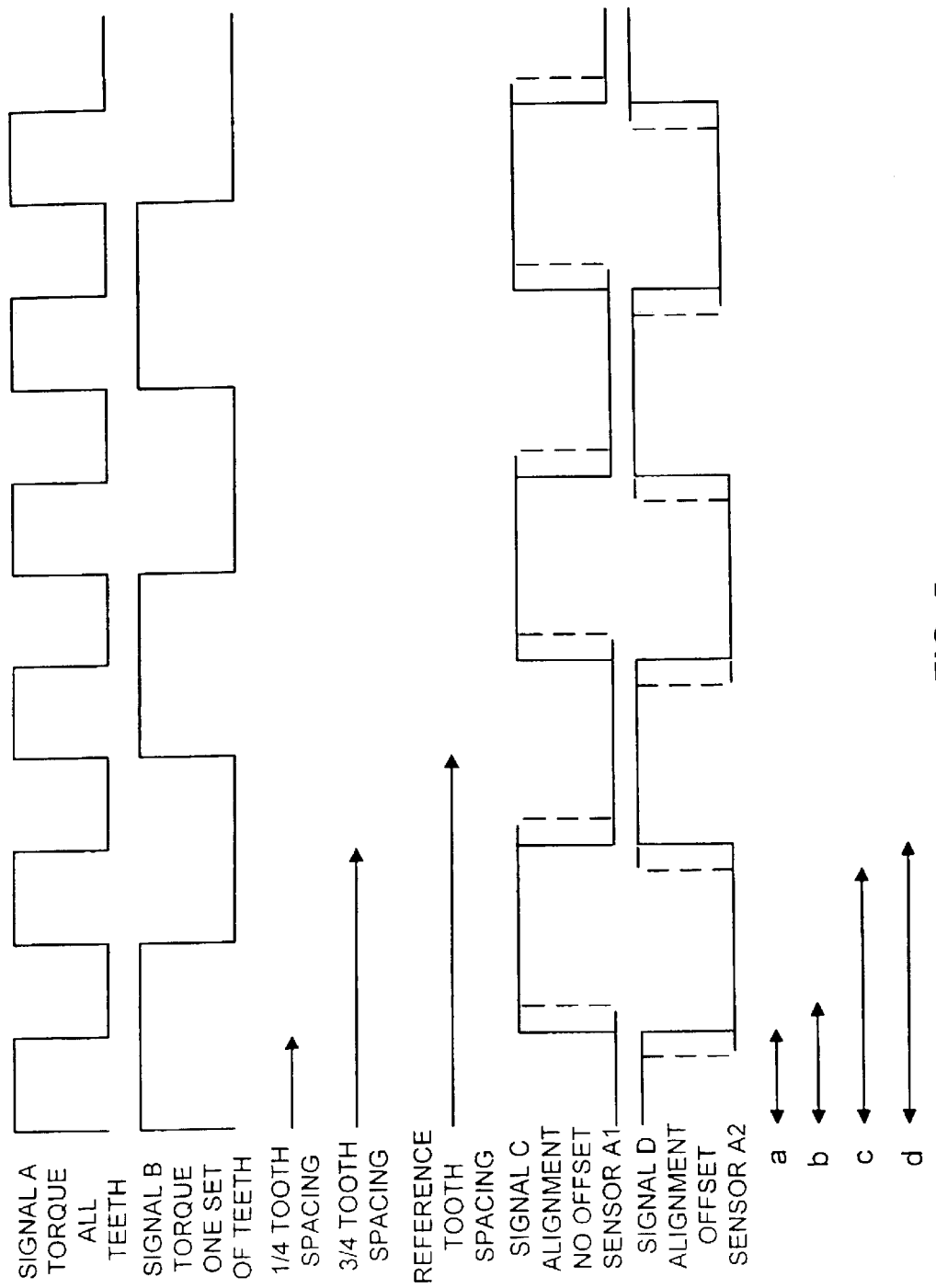

APPARATUS FOR DETECTING TORQUE, AXIAL POSITION AND AXIAL ALIGNMENT OF A ROTATING SHAFT

FIELD OF THE INVENTION

The present invention relates to systems that determine characteristics of a rotatable shaft, such as torque, axial location and axial alignment.

BACKGROUND OF THE INVENTION

In equipment having rotatable shafts coupled together, torque, axial location and axial alignment are measured for use in monitoring the equipment for proper operation and life preservation. Monitoring of the rotatable shafts and couplings is performed to maintain a collinear relationship between the centerlines of coupled shafts and to maintain the torque transmitted through the shafts within predefined limits. Where angular variations between rotating shaft centerlines occurs, the degree of this variation is to be determined if realignment of the centerlines is to he performed. If flexible couplings are used to accommodate shaft realignment, the degree of misalignment is monitored to ensure that couplings remain within predefined operating limits for coupling life preservation. As rotatable shafts are often positioned within a confined area having a harsh environment, measurement of the characteristics of torque, axial location and axial alignment from the same apparatus that is capable of withstanding such environmental stress reduces the size and possible negative performance effects of the measuring apparatus.

SUMMARY OF THE INVENTION

In accordance with one aspect of the present invention there is provided an apparatus for obtaining an indication of torque, axial alignment and axial location for a shaft rotating about an axis of rotation, said apparatus comprising: a first set of detectable elements operably connected to the shaft and positioned parallel to the axis of rotation; a second set of detectable elements parallel to the axis of rotation and interlaced in a sensing plane with said first set of detectable elements, said second set of detectable elements having a variable relative position with respect to said first set of detectable elements; a third set of detectable elements positioned laterally to said first set of detectable elements and said second set of detectable elements in an alignment plane parallel to the sensing plane, said third set of detectable elements being positioned at an offset angle to the axis of rotation; and a plurality of sensors positioned to detect passage of said first set of detectable elements, said second set of detectable elements and said third set of detectable elements, each of said plurality of sensors producing a signal in response to detection of detectable elements; wherein relationships for signals produced from detection of said first, second and third sets of detectable elements with respect to a reference signal produced by detection of detectable elements in a plane separate from the alignment plane provides an indication of torque, axial alignment and axial location.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION

Figure 1D:
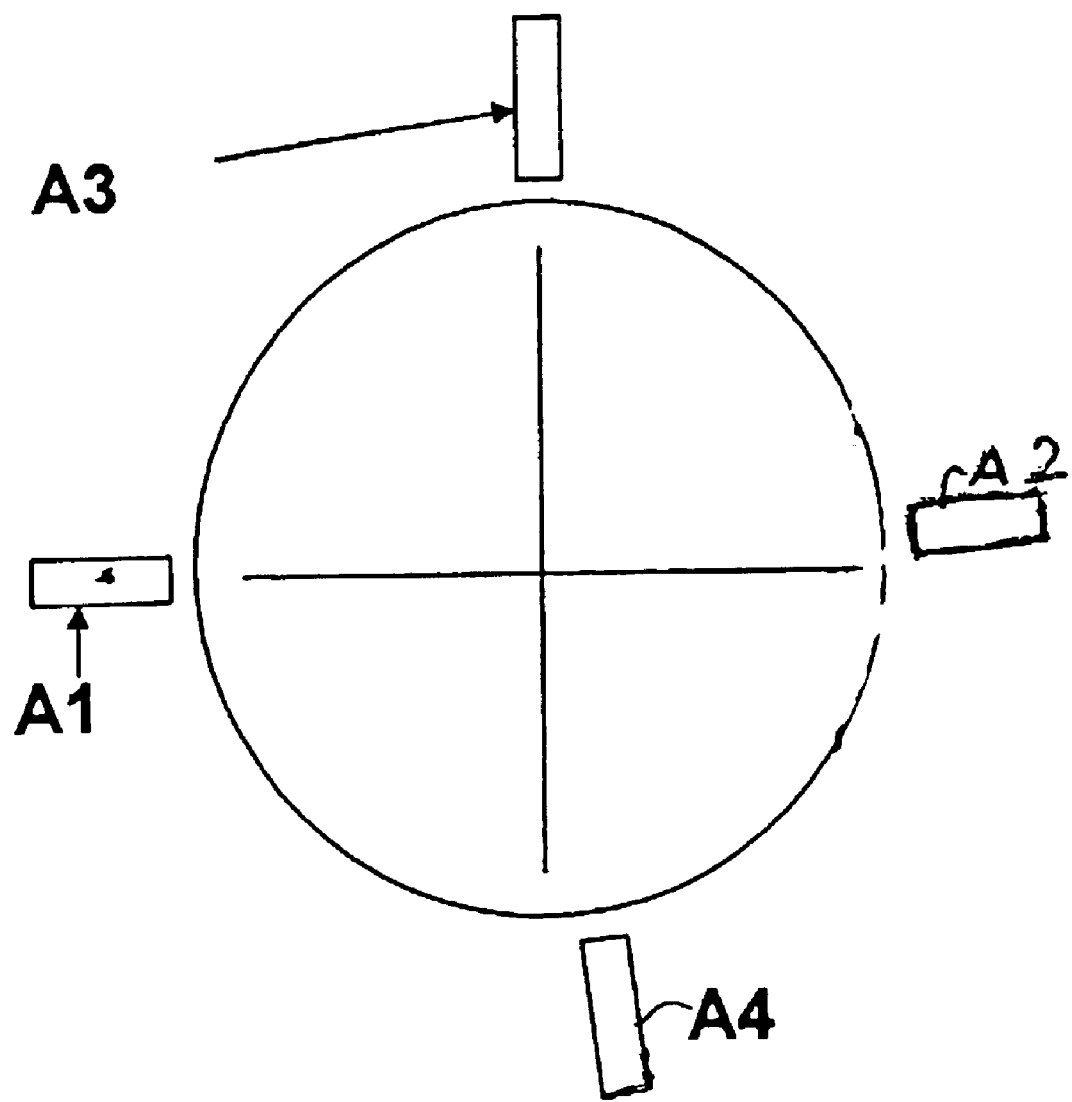
FIG. 1D is an end view of the monitoring apparatus of FIG. 1A illustrating a configuration of sensors as located around the periphery of wheel 54.
Figure 2:
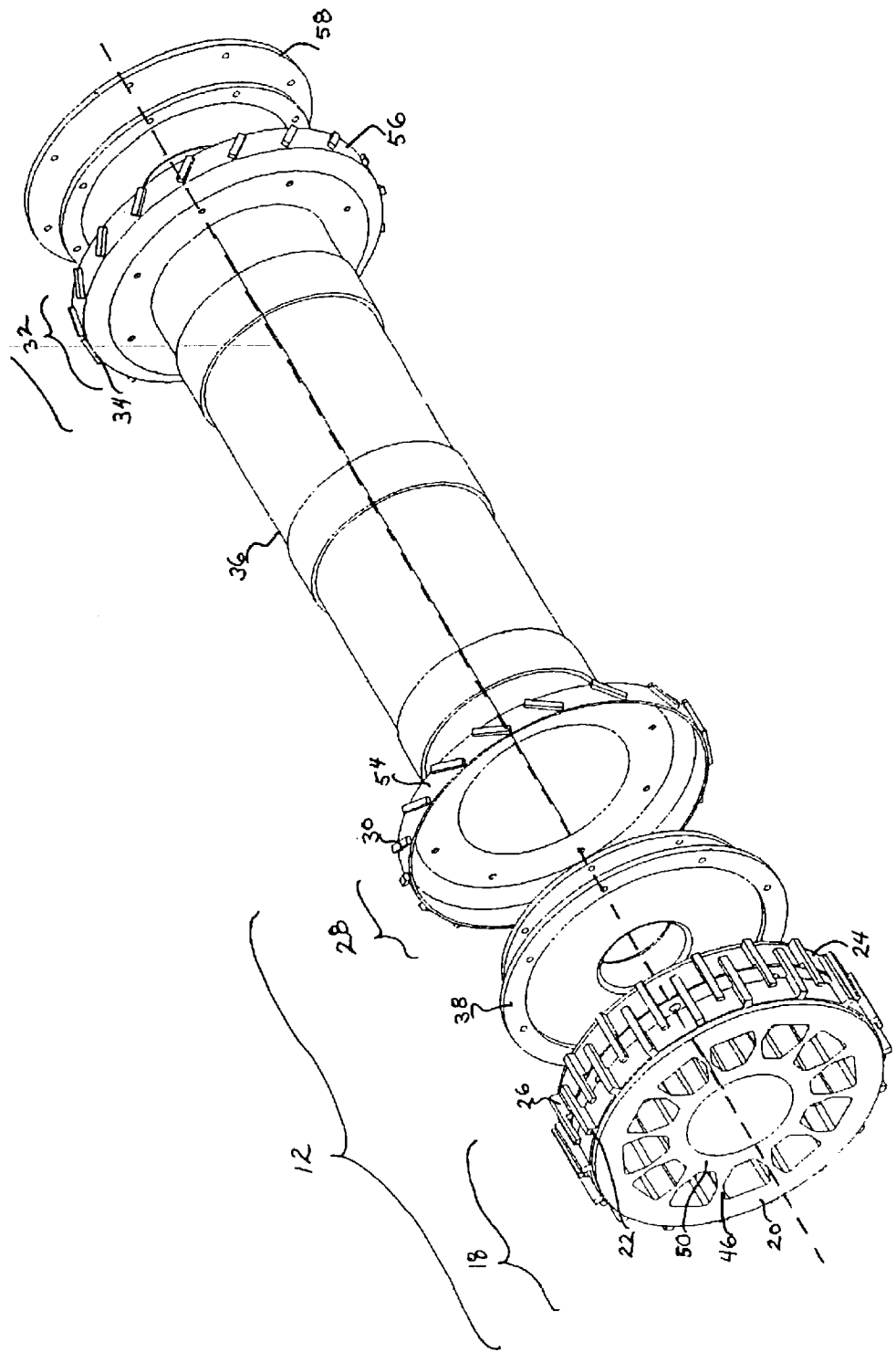
FIG. 2 is an exploded view of the monitoring apparatus of FIG. 1A.

FIGS. 1A to D and 2 show a monitoring apparatus 10 that monitors characteristics such as torque, axial alignment, axial location and axial vibration in coupled rotatable shafts in accordance with a first embodiment of the present invention. Shafts (only one shaft is shown) are connected via a flexible coupling 38, such as a diaphragm coupling. One of the rotatable shafts (not shown) may act as a drive shaft and be coupled to a driving means (not shown), such as a turbo shaft engine, etc. The other rotatable shaft 36 may act as a driven shaft and be coupled to another shaft (not shown) or a load device (not shown), such as a generator, etc.

A drive end assembly 12 is integrated with the flexible coupling 38 to measure various characteristics of the shafts 36 and coupling 38, such as torque, axial location, axial vibration and axial alignment. The drive end assembly 12 has a torque assembly 18 to which the drive shaft is connected at one end and the coupling 38 at the other end. The drive end assembly 12 also has a first alignment assembly 28 connected on one side to the coupling 38 and on the other side to the driven shaft.

Figure 3:
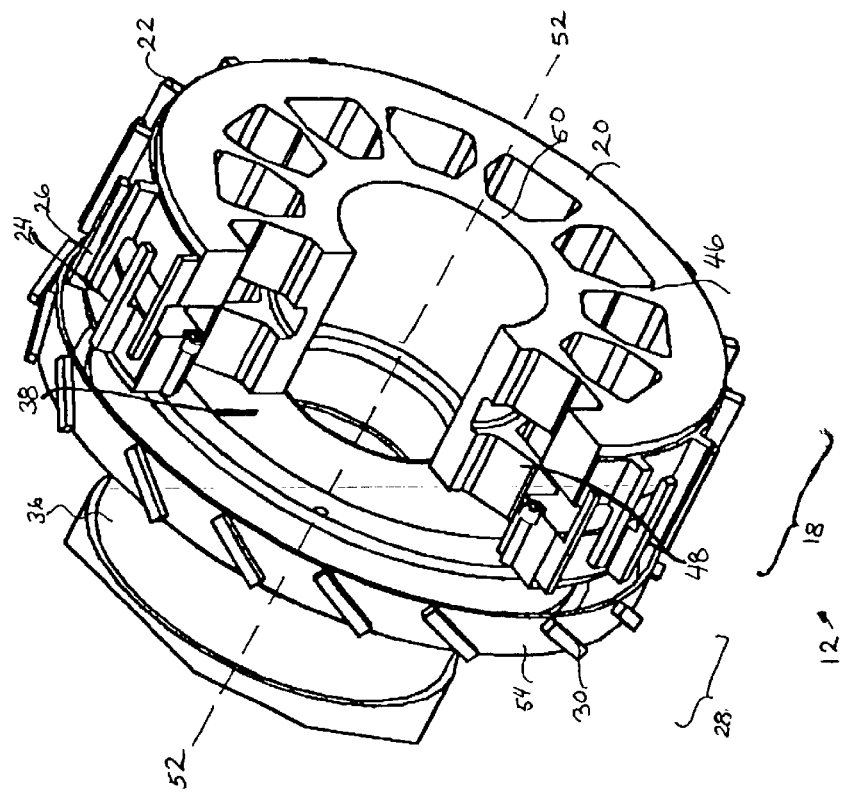
FIG. 3 is a cut away view of the torque assembly of FIG. 1C and a first alignment assembly of the monitoring apparatus of FIG. 1A.

The torque assembly 18 is composed of two connected wheels 20,24, each wheel 20,24 having a set of teeth 22,26 that interlace with the teeth 22,26 of the other wheel 20,24, as shown in FIG. 3. A measurement wheel 20 is located on the drive side of the drive end assembly 12 and is connected to the drive shaft. A reference wheel 24 is located on the driven side and is connected to the coupling 38. The measurement wheel 20 and the reference wheel 24 are connected together by an inner wheel 50 via spokes 46,48, radiating outwardly from the inner wheel 50 to the measurement wheel 20 and the reference wheel 24. That is, the measurement wheel 20 and the reference wheel 24 are free to rotatably deflect but are connected to form the torque assembly 18 via an inner wheel 50, that restricts the amount of rotatable deflection of the two wheels 20,24.

The measurement wheel 20 contains parallel measurement teeth 22 on the surface thereof oriented such that they are parallel to an axis of rotation 52 of the shaft 36. The measurement teeth 22 extend beyond the surface of the measurement wheel 20 over a gap between the measurement wheel 20 and the reference wheel 24, and preferably overlap a portion of the reference wheel 24. The center of the gap between the measurement wheel 20 and the reference wheel 24 defines in a torque sensor plane 44 where torque (differential rotatable deflection) transmitted through the torque assembly 18 is measured. Similarly, the reference wheel 24 contains parallel reference teeth 26 on the surface thereof oriented such that they are parallel to the axis of rotation 52. The reference teeth 26 extend beyond the surface of the reference wheel 24 over the gap between the measurement wheel 20 and the reference wheel 24, and preferably overlap a portion of the measurement wheel 20. The measurement teeth 22 and the reference teeth 26 are offset from each other with approximately equal spacing between each subsequent tooth 22,26 along the torque sensor plane 44.

The teeth 22,26 are detected as they rotate with the torque assembly 18 past sensors 16 placed in close proximity thereto in the torque sensor plane 44. As the teeth 22,26 pass by a sensor 16, the sensor 16 is excited. The teeth 22,26 are sufficiently spaced to reduce errors in detection of the teeth 22,26 due to excitation of the sensors 16 from sequentially positioned teeth 22,26. That is, the spacing of the teeth 22,26 is sufficient to allow excitation of the sensor 16 caused by detection of one tooth 22,26 to be significantly reduced before excitation of the sensor 16 from detection of a subsequent tooth 22,26 becomes significant. The measurement wheel 20 and the reference wheel 24 are rotationally displaced with respect to one another when torque applied to the torque assembly 18. The rotational displacement of the wheels 20,24 changes the spacing between the teeth 22,26 which can be detected in the torque sensor plane 44.

The first alignment assembly 28 has a first alignment wheel 54 positioned over the coupling 38. The first alignment wheel 54 contains parallel first alignment teeth 30 on the surface thereof oriented at an angle to the axis of rotation 52. The angle at which the first alignment teeth 30 are positioned is related to the expected axial alignment range and the desired sensitivity to detection of change in position of the first alignment teeth 30. For example, the first alignment teeth 30 may be positioned at a 30° angle to the axis of rotation 52. The first alignment teeth 30 may be positioned on the first alignment wheel 54 such that the center of the first alignment teeth 30 is aligned with the center of a space between consecutive teeth 22,26 of the torque assembly 18 along the axis of rotation 52. The first alignment wheel 54 may have the same number of teeth 30 as the measurement wheel 20 or the reference wheel 24.

The number of teeth 22,26,30 on the measurement wheel 20, the reference wheel 24 and the first alignment wheel 54 is determined by the diameter of the wheels 20,24,54, which is dictated by space constraints of the installation environment, sufficient spacing between the teeth 22,26,30 to reduce errors during detection and the desired frequency of a signal obtained by detection of the teeth 22,26,30.

The first alignment wheel 54 is positioned such that its center and the center of the first alignment teeth 30 are in a plane perpendicular to the axis of rotation 52 and corresponds with the center of the coupling 38 and a first axis of coupling deflection 40. The position of the center of the first alignment teeth 30 and therefore the first alignment wheel 54 is used in determining axial location of the shaft 36 along the axis of rotation 52.

Figure 4:
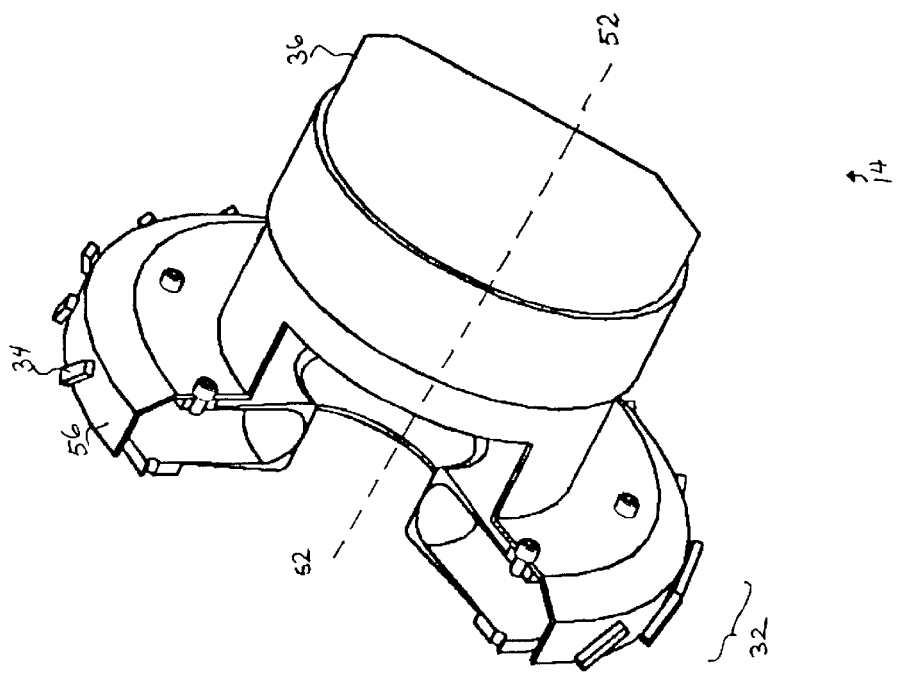
FIG. 4 is a cut away view of a second alignment assembly of the monitoring apparatus of FIG. 1A.

A driven end assembly 14 is located at the end of the shaft 36 opposite the drive end assembly 12. The driven end assembly 14 has a second alignment assembly 32 similar in configuration to the first alignment assembly 28 as shown in FIG. 4. The second alignment assembly 32 has a second alignment wheel 56 positioned over a second coupling 58 connecting the driven end of the shaft 36 to another shaft (not shown). The second alignment wheel 56 contains parallel second alignment teeth 34 on the surface thereof oriented at an angle to the axis of rotation 52. The angle of the second alignment teeth 34 may correspond to the angle of the first alignment teeth 30. The second alignment wheel 32 is positioned such that its center is in a plane perpendicular to the axis of rotation 52 and corresponds with the center of the second coupling 58 and a second axis of coupling deflection 42.

Axial alignment of the coupling 38 and axial location of the shaft 36 is obtained from a timing relationship of oppositely mounted sensors 16 around the circumference of the first alignment wheel 54 and the torque assembly 18. Measurement of axial vibration is determined by measurement of axial location over time.

Sensors 16 are placed at various locations in close proximity to the various teeth 22,26,30,34 for detection thereof. The sensors 16 may be attached at various locations within a housing (not shown) for the rotatable shafts. Preferably, the sensors 16 are positioned at an equal distance from the circumference of the wheels 20,24,54,56 containing the teeth 22,26,30,34. Each of the sensors 16 produces an output signal that corresponds to detection of teeth 22,26,30,34 as they rotate past the sensor 16. For example, the sensors 16 may be monopole variable reluctance sensors that produce an electrical output signal that is a function of flux variation in the sensor 16 induced by using magnetic material for teeth 22,26,30,34. Alternatively, magneto-optic sensor may be used as well as optical sensors with optically reflective material on the teeth 22,26,30,34.

The sensors 16 are positioned in the second axis of coupling deflection 42 over the second alignment assembly 32, in the first axis of coupling deflection 44 over the first alignment assembly 28, and in the torque sensor plane 44 centered over the gap between the measurement wheel 20 and the reference wheel 24. At least one sensor 16 is positioned over the torque assembly 18 along the torque sensor plane 44 in close enough proximity to detect the measurement teeth 22 and the reference teeth 26. The phase relationship of consecutive pulses in the signal produced by this sensor 16 from detection of the teeth 22,26 corresponds to the torque transmitted through the torque assembly 18.

The sensors 16 are positioned around the first and second alignment wheels 54, 56 to produce teeth detection signals having predetermined relationships between their phases. For example, the sensors 16 may be positioned at equal circumferential distances, as in FIG. 1C showing four sensors 16, or the sensors 16 may be offset to create timing differences, as in FIG. 1D, also showing four sensors 16. Sensors A1, A2, A3 and A4 in FIG. 1D are sensors 16 that have been individually designated A1–A4 for description purposes. Placement of the sensors 16 around the first alignment wheel 54 is determined to generate a signal from detection of the first alignment teeth 30 where the generated signal has a predetermined phase delay relative to a signal produced by detection of the reference teeth 26. One sensor 16 is placed over the alignment wheel 54 to produce a signal with a first phase delay and another sensor 16 is placed on the opposite side of the alignment wheel 54 to produce a signal with a larger second phase delay. Summation of the first and second phase delays provides an indication of axial shaft location, whereas the difference of the two phase delays provides an indication of the axial alignment of the coupling 38. Axial vibration is obtained from the summation of the phase delays over time.

Sensors A2 and A4 in FIG. 1D are positioned to produce a signal from detection of the teeth 30 with a phase difference of approximately ¼ and ¾ of the space between the teeth 30, respectively, relative to the signal generated from detection of the reference teeth 26. The offset of sensors A2 and A4 may be any offset that maintains the phase difference of the signals produced therefrom within a predetermined range.

Sensors 16 are positioned around the second alignment wheel 56 such that signals generated therefrom by detection of the teeth 34 at oppositely positioned sensors 16 have a phase difference of approximately 180°. When alignment across the second coupling 58 changes, the phase difference between signals generated by sensors 16 in the same plane will change correspondingly with changes in alignment in that plane.

Figure 10:
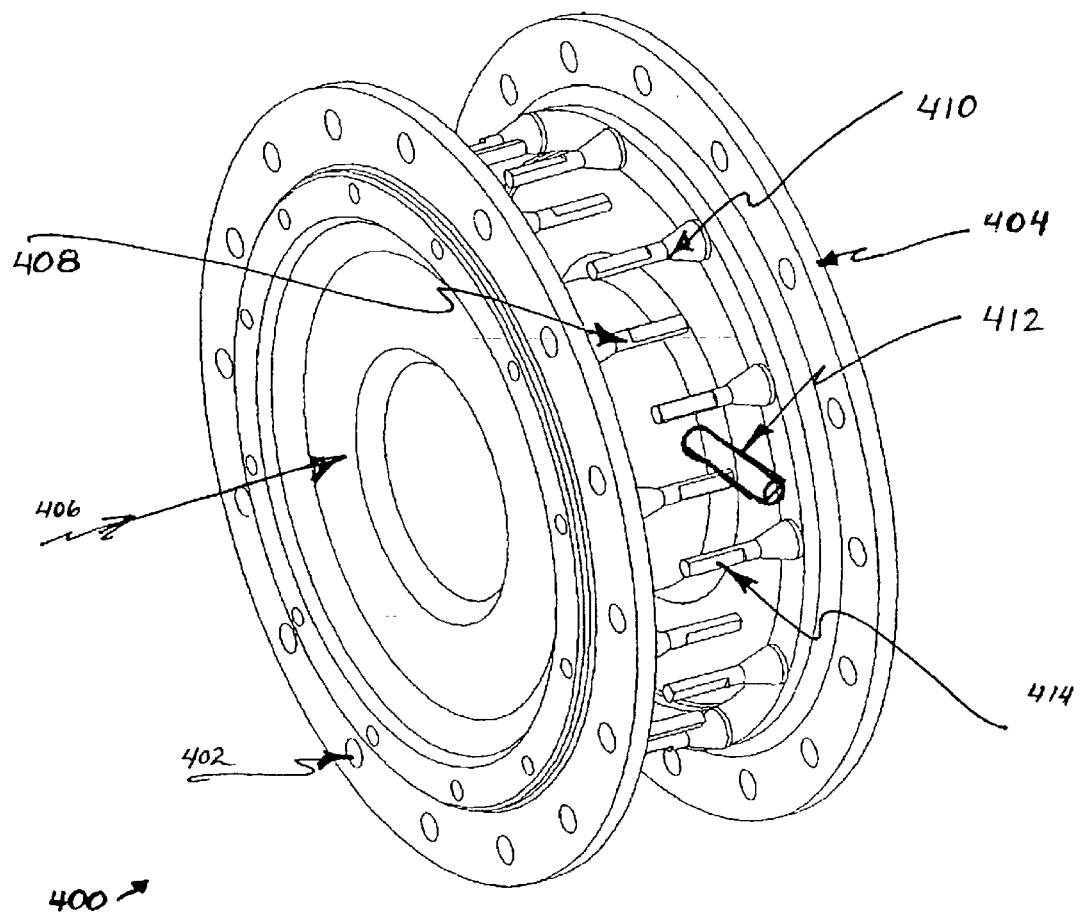
FIG. 10 is an isometric view of a torque assembly in accordance with a fourth embodiment of the present invention.

Derivation of torque, axial alignment, axial location and axial vibration is performed by a processing system 300, shown in FIG. 10, in communication with the sensors 16.

Figure 1A:
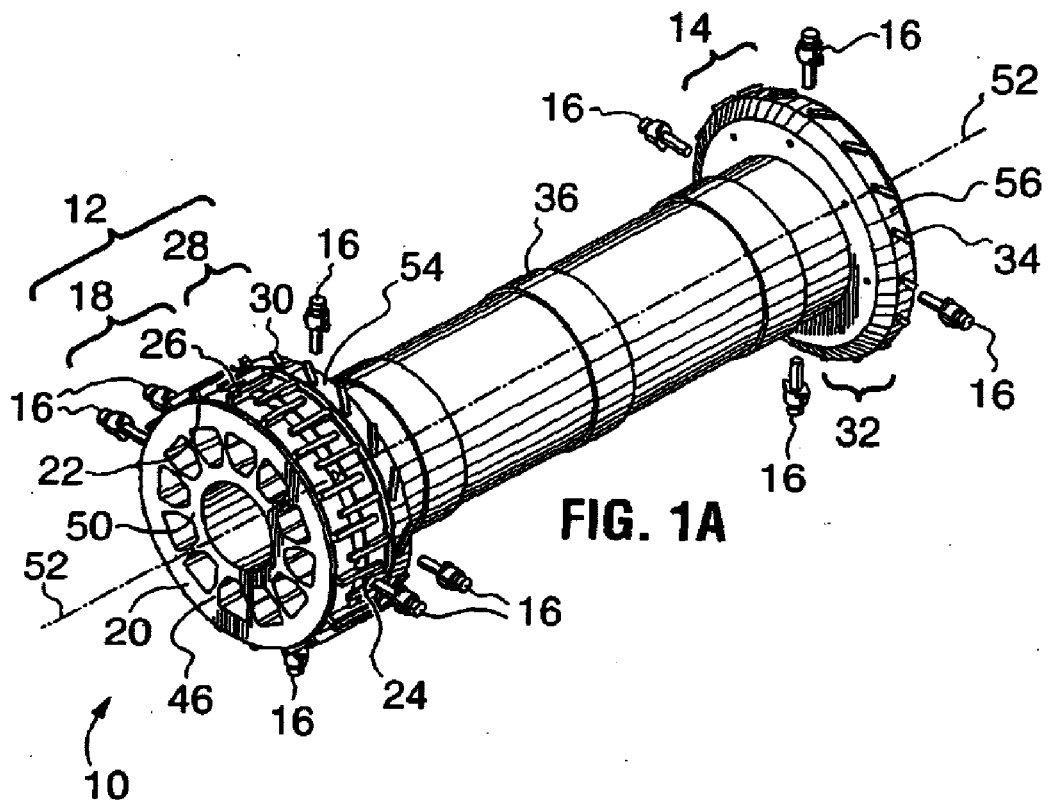
FIG. 1A is an isometric view of a monitoring apparatus located on a shaft in accordance with a first embodiment of the present invention.
Figure 1B:
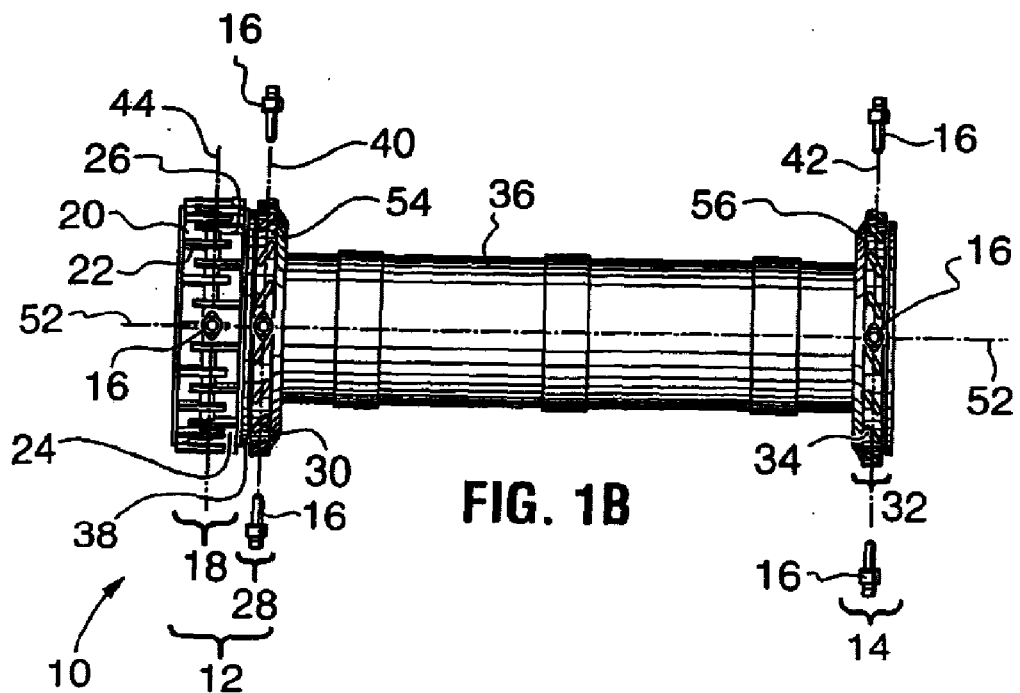
FIG. 1B is a side view of the monitoring apparatus and shaft of FIG. 1A.
Figure 1C:
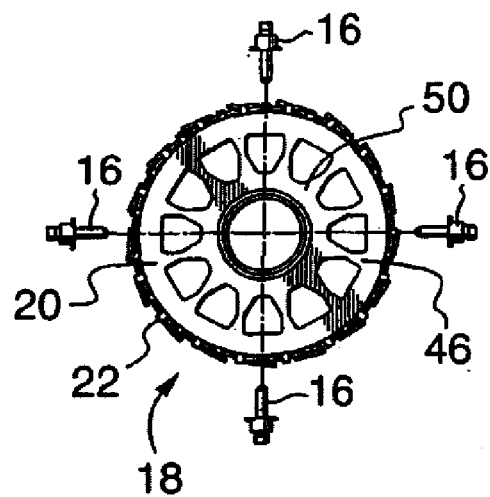
FIG. 1C is an end view of a torque assembly of the monitoring apparatus of FIG. 1A.
Figure 1D:
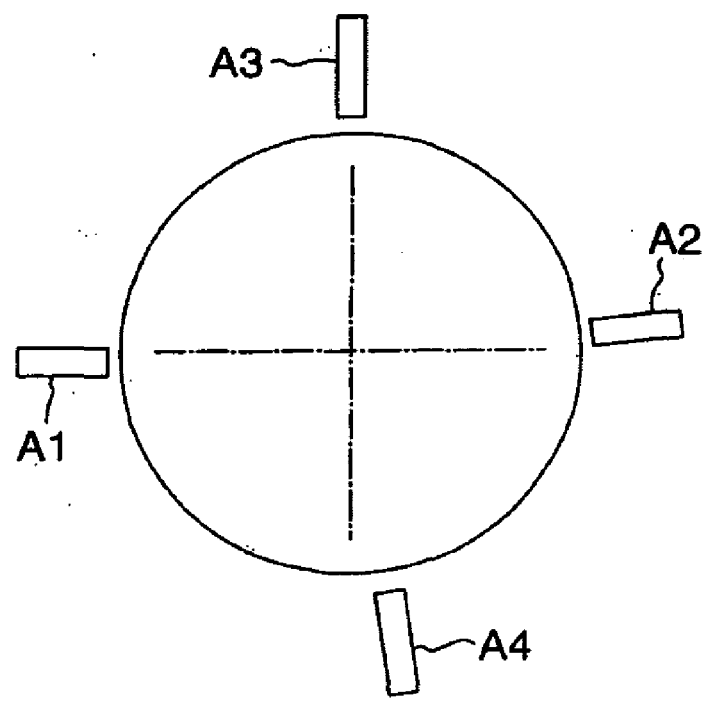
Figure 2:
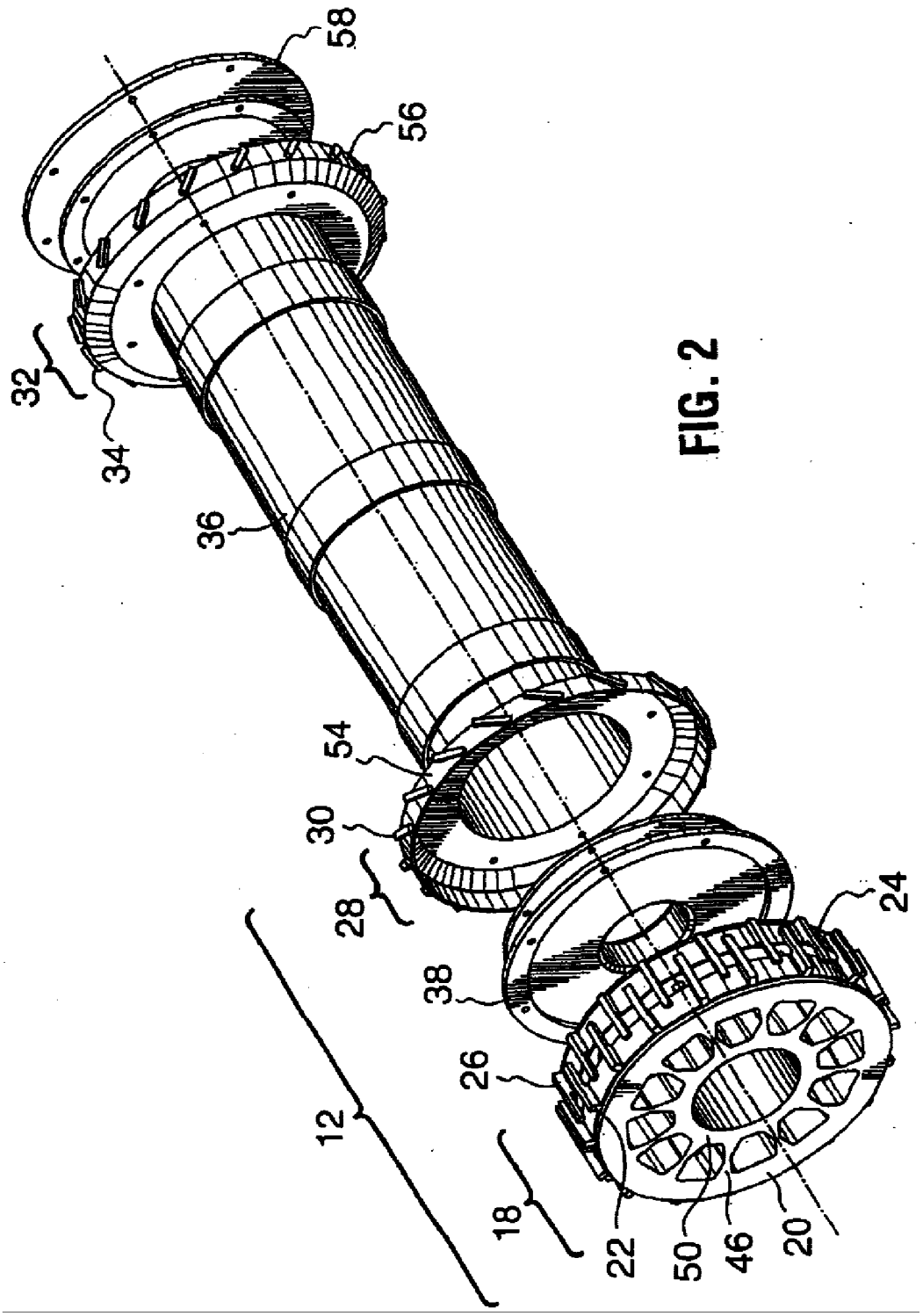
Figure 3:
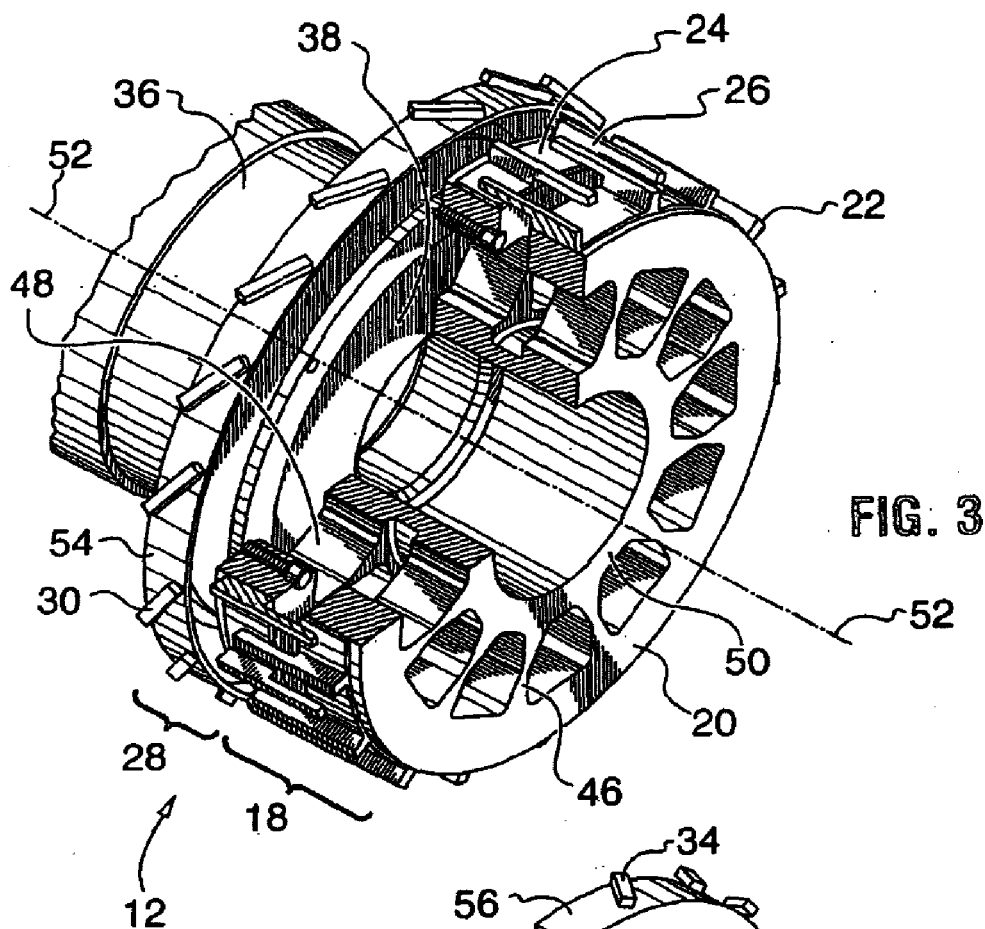
Figure 4:
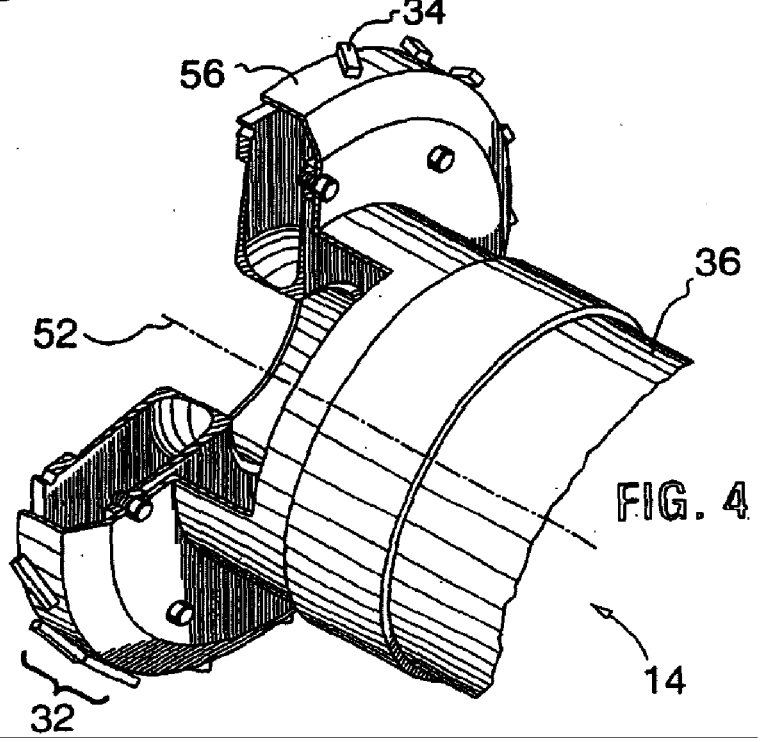
Figure 5:
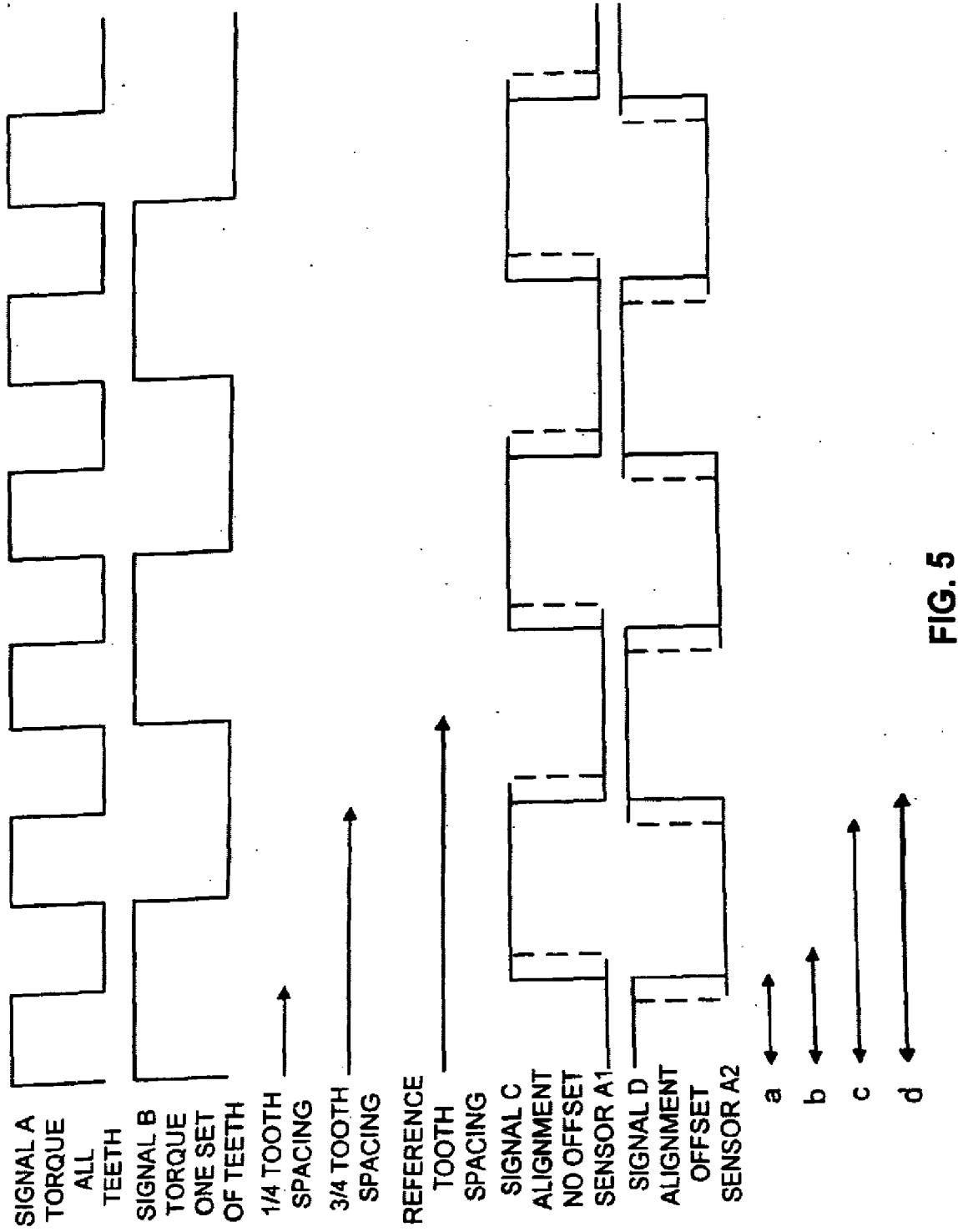
FIG. 5 is a timing diagram of detection and monitoring signals of the monitoring apparatus of FIG. 1A.
Figure 6:
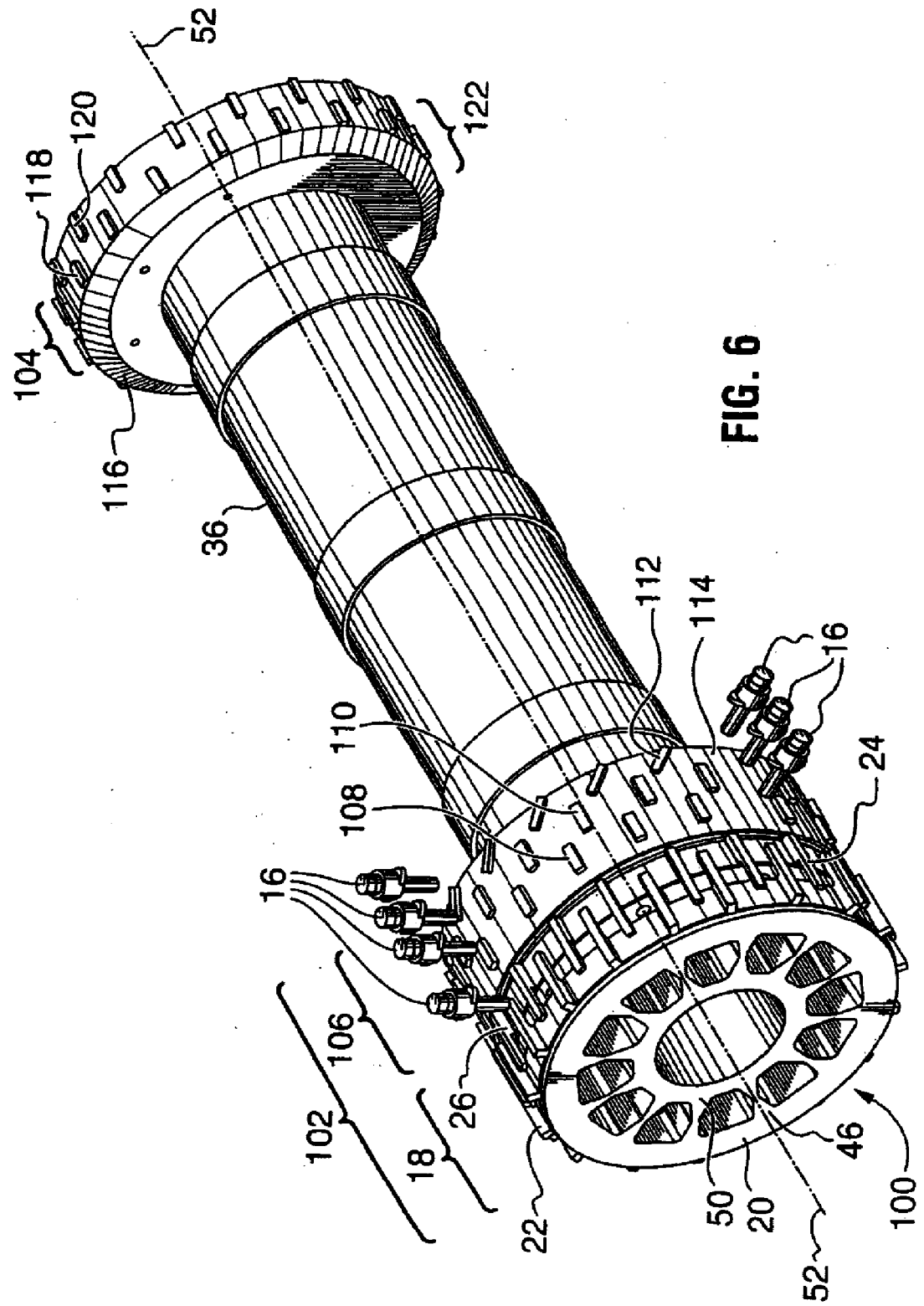
Figure 7:
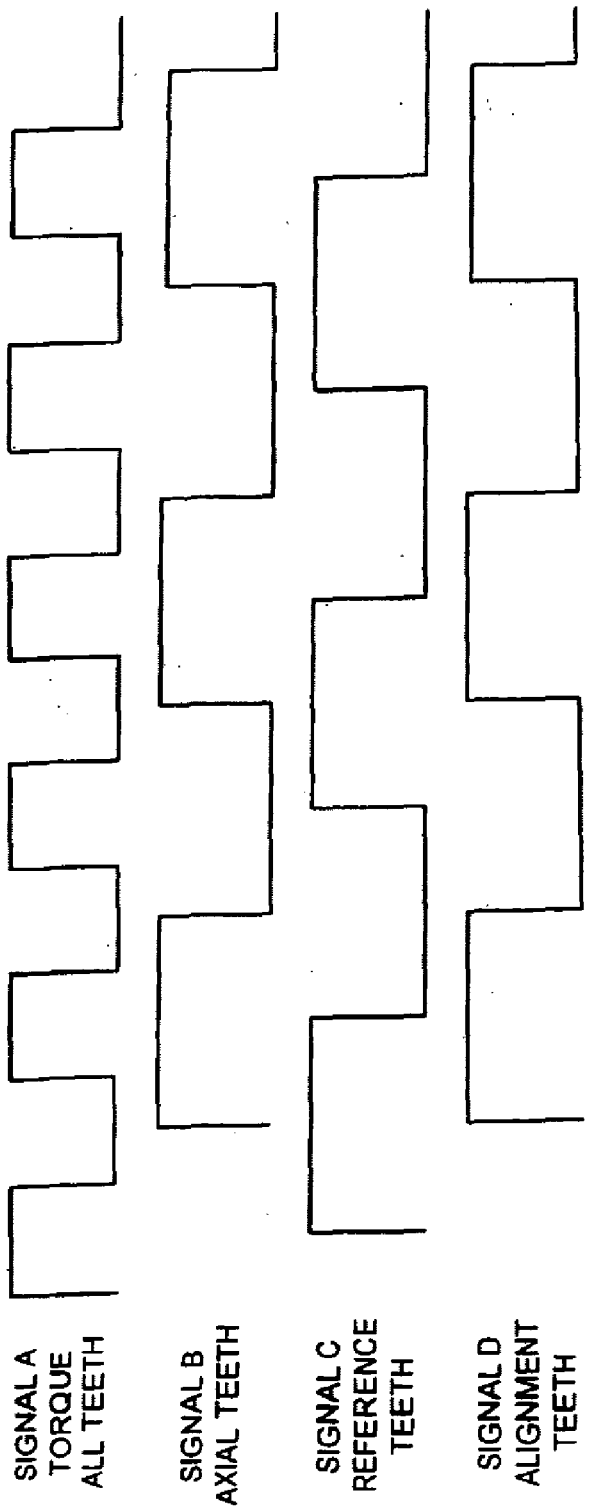
Figure 8:
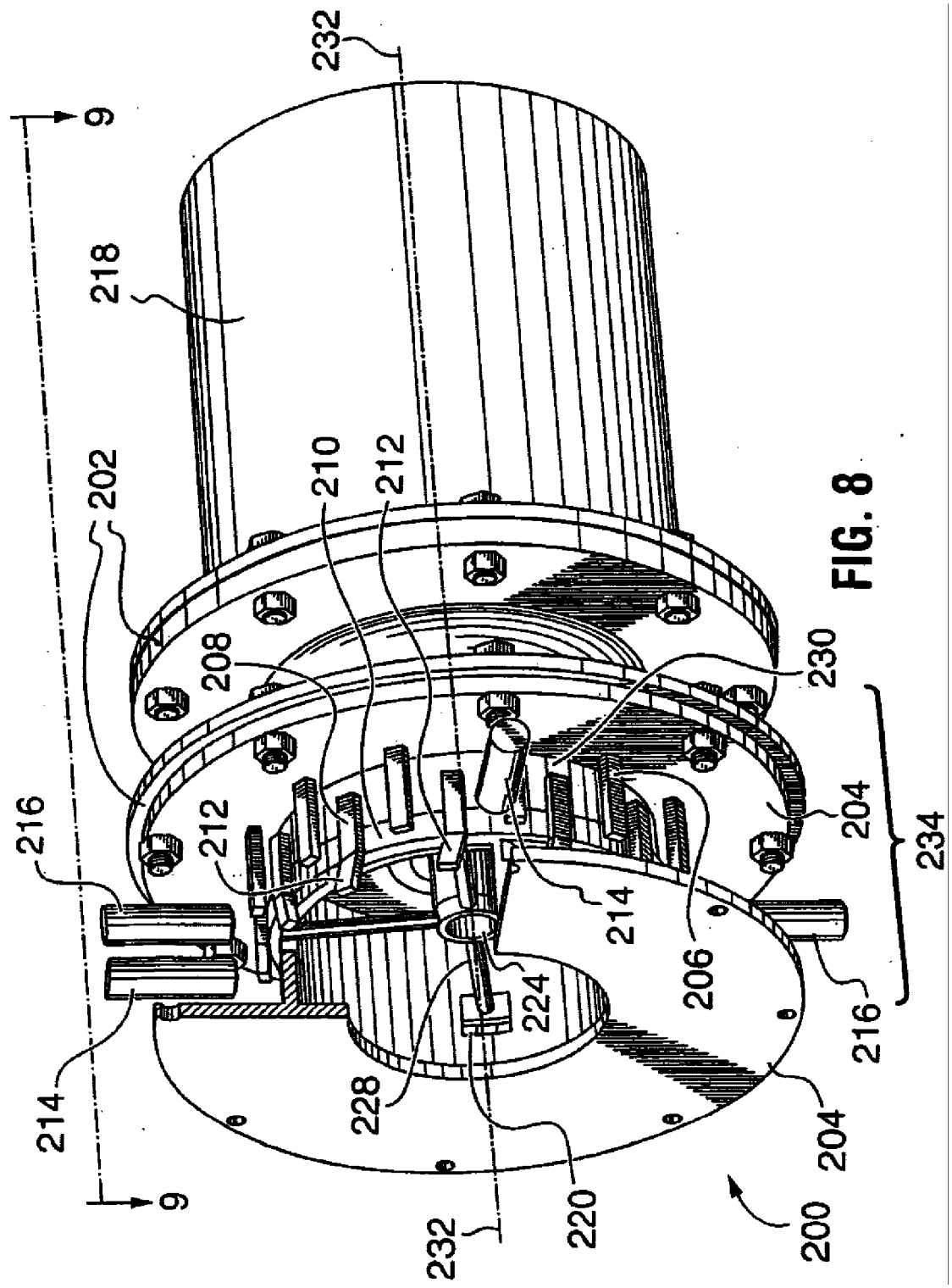
Figure 9:
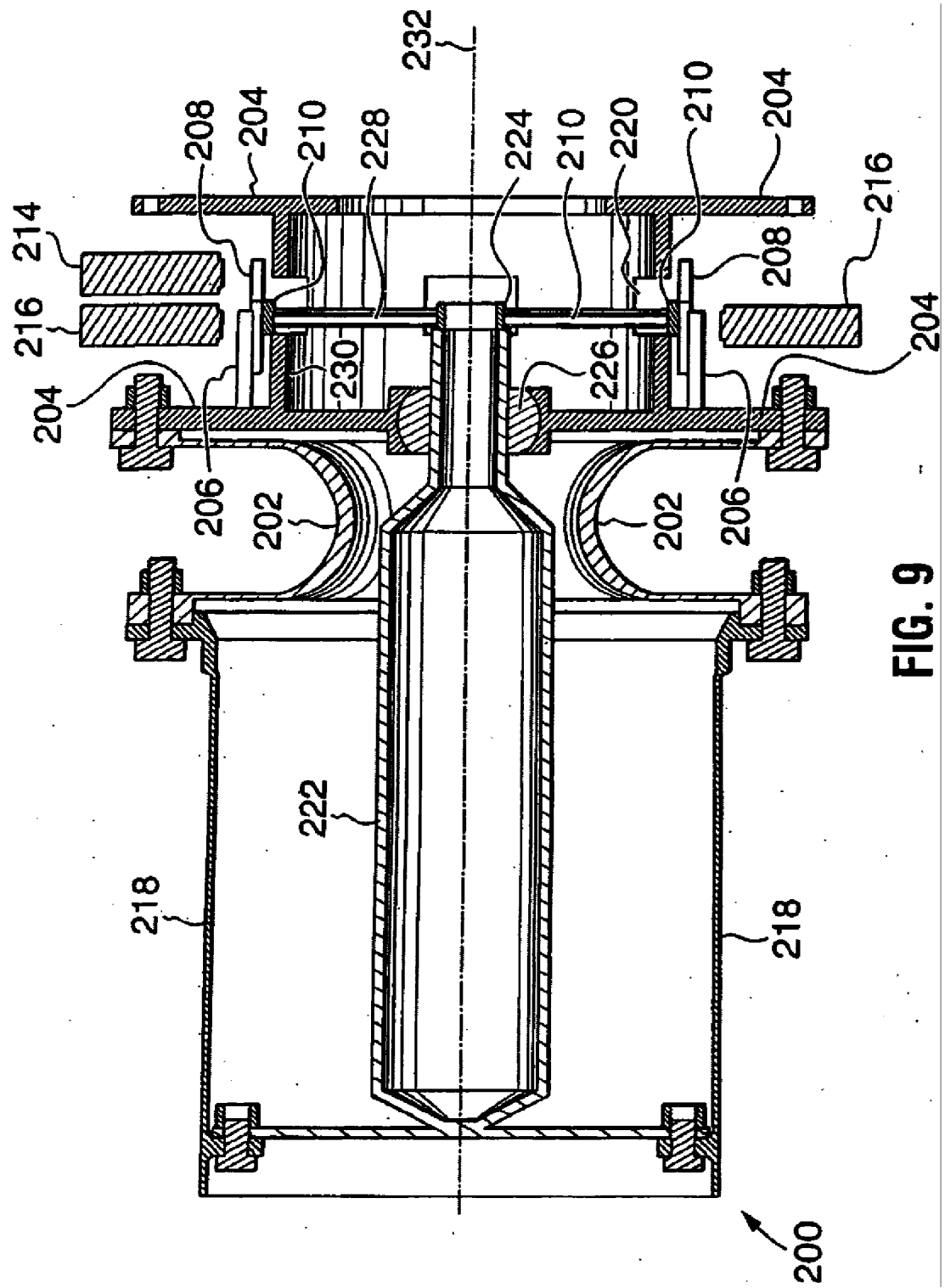
Figure 10:
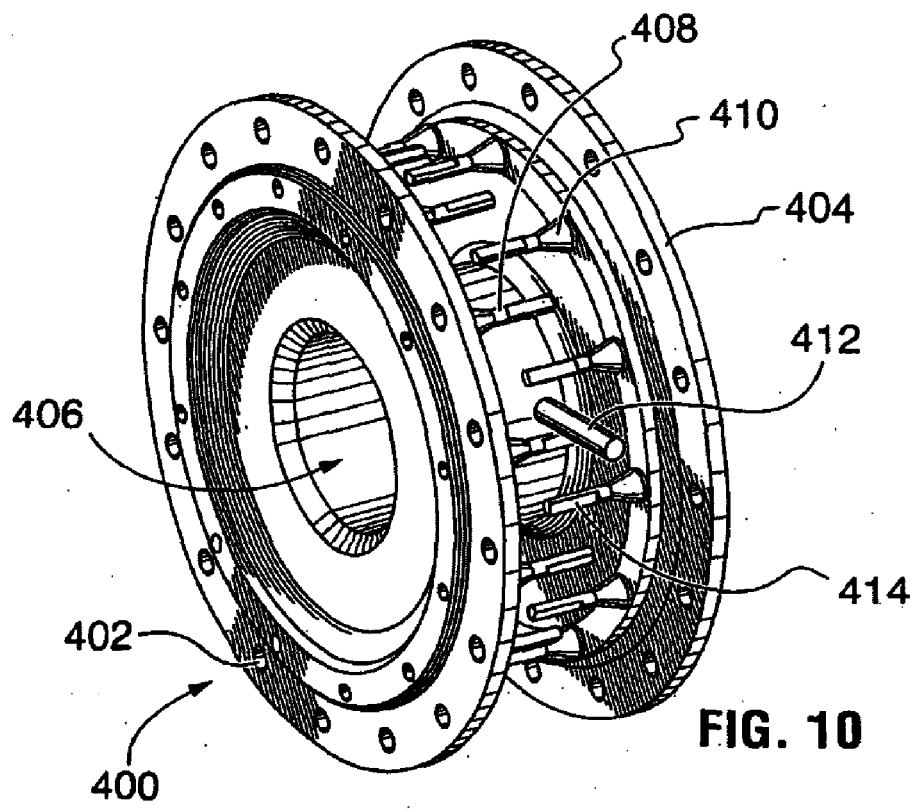
Figure 11:
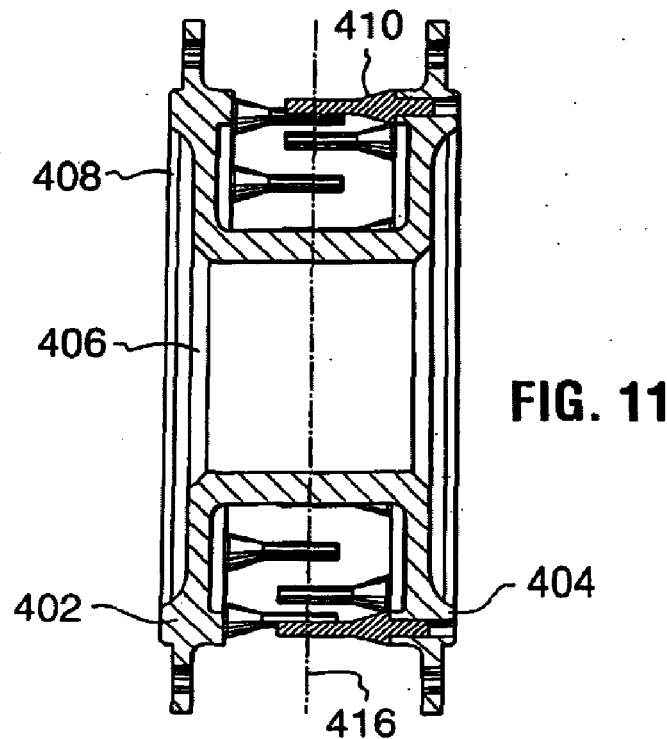
Figure 12:
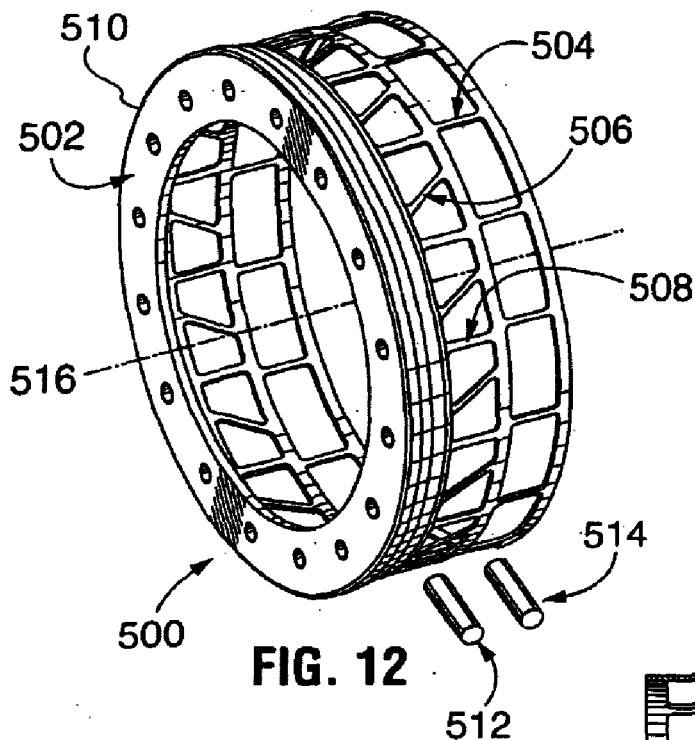
Figure 13:
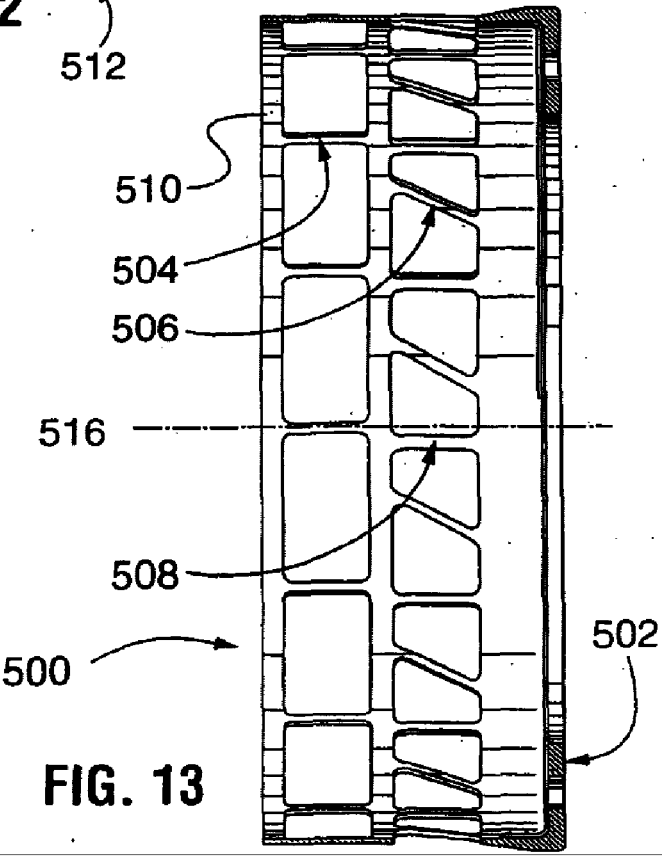
Figure 14:
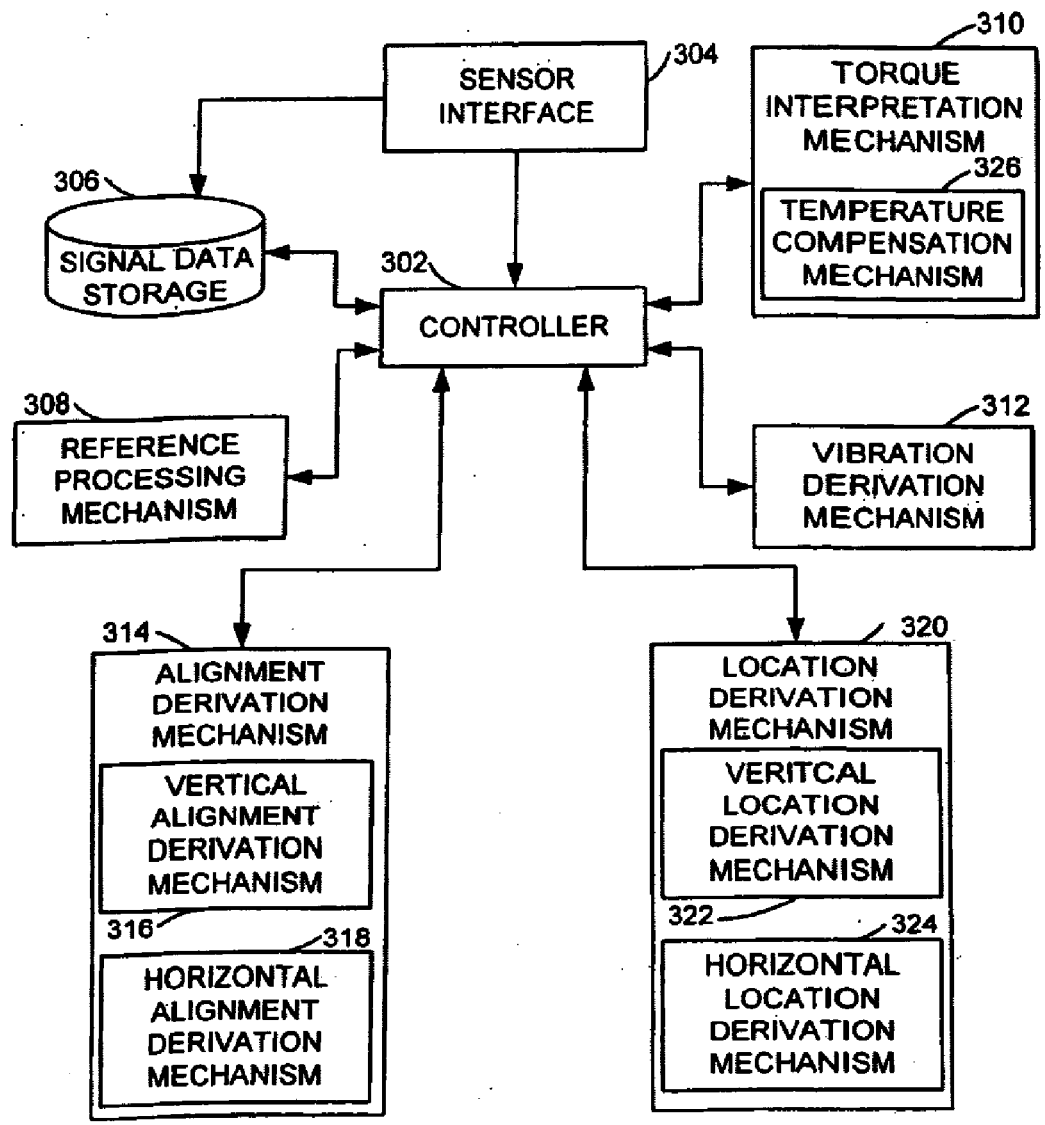

FIG. 5 illustrates derivation of various characteristics of the shaft 36 from measurements obtained by the sensors 16 in the apparatus 10 of FIG. 1A. In a case where the sensor 16 is of a monopole variable reluctance type, a generally sinusoidal signal is produced by the sensor 16 as passing of the teeth 22,26,30,34 is detected. The sensor's output signal goes through a zero (voltage crossover) as each tooth center passes by the sensor 16. By detecting the zero crossing, the sensor output signal can be converted from an analog format to a digital format with an "on/off" ratio, or "high/low" ratio, that is a function of the spaced relationship of the teeth 22,26,30,34 as they pass the sensor 16.

As the shaft 36 rotates, and the drive end assembly 12 therewith, the sensor 16 positioned above the torque assembly 18 in the torque sensor plane 44 detects changes in electromagnetic flux related to the passage of teeth 22,26. The signal produced by each sensor 16 over the torque assembly 18 (i.e. torque signal) in response to detection of the teeth 22,26 and further modified by a zero-cross over circuit is illustrated as signal A in FIG. 5.

Torque can be assessed by examining the periodic nature of signal A. As torque varies, the relationship of time at which a measurement tooth is detected to the overall period time of detection from tooth to tooth also changes. Determination of this timing relationship provides an indication of torque transmitted through the shaft 36. For example, if the duration of each peak is not the same as the duration of each valley then this indicates unequal spacing of the teeth 22,26 and therefor torque on the shaft 36. That is, if the time between sequential signal changes (or zero crossings) is not the same then this indicates an uneven spacing of the teeth 22,26. Tooth passage detection frequency may also be used as an indicator for rotation speed of the shafts 36.

In a manner similar to torque sensing, the sensors 16 over the first alignment assembly 28 produce a signal in response to teeth detection 30. Since the first alignment teeth 30 are parallel and evenly spaced and they fall between consecutive reference teeth 26 of the torque assembly 18, the signal produced by detection of the first alignment teeth 30 (signals C and D) has a period twice that of signal A. A reference signal B having the same period as signals C and D can be produced by detection of only the reference teeth 26. The signal produced by detection of the first alignment teeth 30 retains the same shape regardless of axial position due to the parallel orientation of the first alignment teeth 30; however, the signal may have a time offset due to the angular orientation of the first alignment teeth 30. That is, axial displacement produces a change in the time between detection of reference teeth 26 and detection of the first alignment teeth 30 while the time between detection of successive first alignment teeth 30 remains constant. This constant period between detection of alignment teeth 30 maintains a measure of shaft axial alignment regardless of axial shaft location. The changes in shaft axial alignment are realized in phase differences between signals generated from detection of the alignment teeth 30 and signals generated from detection of the reference teeth 26. Consequently, summation or differencing of the phases of signals from sensors A2 and A4 shown in FIG. 1D with respect to the reference signal B (or referenced to signal B) provides an indication of axial location and axial alignment, respectively. Signal C, taken from a first sensor A1, shown in FIG. 1D, is offset from signal B by ¼ of the distance between tooth detections since the first alignment teeth 30 are positioned between the reference teeth 26. Signal D, taken from a second sensor A2, shown in FIG. 1D, is offset from signal B by ¾ of the distance between reference tooth detections due to the offset of sensors A2.

Horizontal axial alignment is determined from a reference signal produced by the torque assembly 18 (signal B) and measurement signals produced by two sensors 16 on opposite sides of the first alignment assembly 28, one of which may have an offset as seen in FIG. 1D. The difference between signal B and the two measured signals (signals C and D) is determined to provide a standard of comparison for each of the two measured signals (i.e. the two measured signals are referenced to signal B). The sum of the two referenced measured signals relates to the axial location (indicated in FIG. 5 by the summation of line d and line a) in the horizontal plane. The sum of the two referenced measured signals over time provides axial vibration in the horizontal plane. The difference in phase between the two referenced measured signals represents the horizontal axial alignment (indicated in FIG. 5 by the difference between line d and line a) across the coupling 38. When axial realignment occurs, the change in phase between signals C and D will be equal and opposite and the amount of phase change will be representative of the degree of axial alignment change in the horizontal plane.

The dashed lined in FIG. 5 for signals C and D represents a misalignment of the shafts 36. The difference between line d and line a represents a neutral shaft alignment whereas the difference between line c and line b represents a misalignment.

Vertical alignment, location and vibration for the shaft 36 can be determined in a manner similar to that used for horizontal alignment, location and vibration using a third alignment sensor (A3) and a fourth alignment sensor (A4) that is offset in a manner similar to the second sensor (A2).

Determination of axial alignment and location based on a difference or sum, respectively, of multiple referenced signals enables discernment between axial movement and changes in shaft axial alignment.

A change in axial shaft location does not affect the accuracy of the alignment determination as the difference between the phase of signals C and D from the first alignment assembly 28 does not change.

Axial alignment of the second coupling 58 is determined using signals obtained from sensors 16 around the second alignment wheel 56. Two sensors (A1 and A2) are located on opposite sides of the second alignment wheel 56 in the horizontal plane with A2 being offset such that detection of teeth 34 at A2 lags behind A1 by approximately ½ the space between the teeth 34. Another two sensors (A3 and A4) are located on opposite sides of the second alignment wheel 56 in the vertical plane. The signal from sensor A1 is used as a reference signal for the signal from sensors A2. The signal from sensor A3 is used as a reference signal for the signal from sensor A4. When the shafts 36 are neutrally aligned, the signal from sensor A2 lags behind the signal from sensor A1 and the signal from sensor A4 lags behind the signal from sensor A3 by approximately 180°. When the alignment of the second coupling 58 changes, the phase lag for the signals from sensors A2 and A4 to their respective reference signals also changes. The change in the phase lag for the signal from sensors A2 and A4 is in a direction and magnitude correspondingly proportional to change in alignment in the respective planes.

Figure 6:
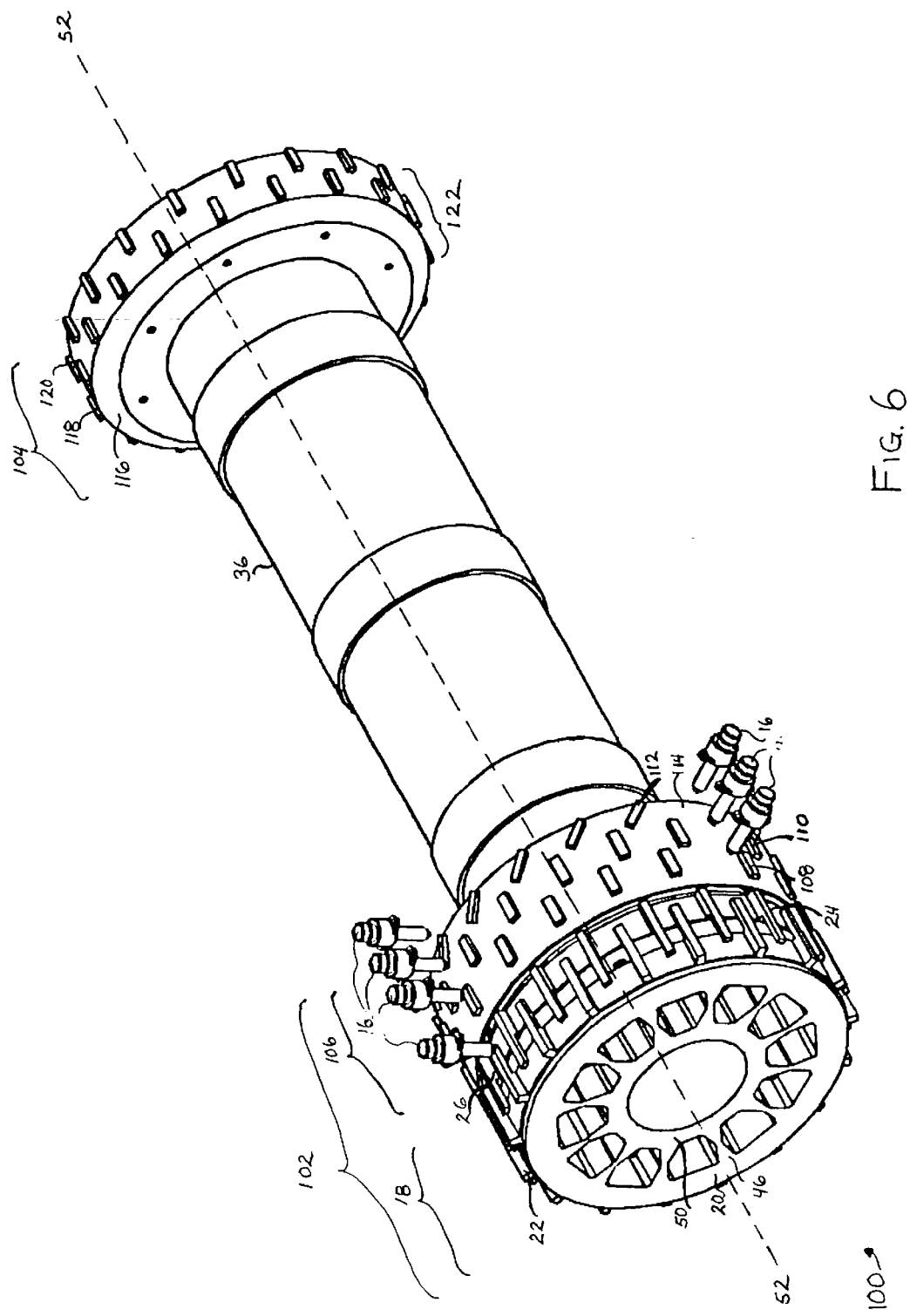
FIG. 6 is an isometric view of a monitoring apparatus located on a shaft in accordance with a second embodiment of the present invention.

FIG. 6 shows a monitoring apparatus 100 that monitors characteristics such as torque, axial alignment, axial location and vibration in coupled rotatable shafts in accordance with a second embodiment of the present invention. The monitoring apparatus 100 has a configuration similar to the monitoring apparatus 10 shown in FIG. 1A with a drive end assembly 102 having a torque assembly 18 at one end of the shaft 36 and a driven end assembly 104 at the opposite end. The drive end assembly 102 includes a flexible coupling (not shown) for connecting the shaft 36 with a drive shaft (not shown).

The torque assembly 18 is connected to the flexible coupling 38 on one side and to the drive shaft on the other. The opposite end of the coupling 38 is connected to a first alignment assembly 106, a portion of which may be positioned over the coupling 38. The first alignment assembly 106 has a first alignment wheel 114 on the surface of which are three sets of teeth 108,110,112 along the axis of rotation 52. A first set of teeth, first alignment teeth 108, are positioned parallel to the axis of rotation 52. A second set of teeth, first reference teeth 110, are positioned next to the first alignment teeth 108 parallel to the axis of rotation 52. The first reference teeth 110 are situated at an offset from the first alignment teeth 108 such that sensors 16 for each set of teeth 108, 110 consecutive along the axis of rotation 52 would not simultaneously sense their respective teeth 108,110. A third set of teeth, axial teeth 112 are situated over the coupling at an offset angle from the axis of rotation 52 and the first alignment and reference teeth 108,110. The center of the axial teeth 112 along the axis of rotation 52 is situated to align with the center of the alignment teeth 108.

Three sensors 16 are located along a line parallel to the axis of rotation 52 and are equally spaced apart so as to align with the centers of their respective teeth 108, 110, 112. The sensor 16 associated with reference teeth 110 provides a reference signal from detection of the reference teeth 110 that is used for the signals generated from detection of the other teeth 108, 112. When the shafts are neutrally aligned and in a neutral axial location, signals generated by the detection of the first alignment and axial teeth 108,112 have a phase difference of approximately 180° from the signal from the reference teeth 110. A change in axial location of the shaft 36 changes the phase difference of the axial teeth signal in a direction and magnitude related to that of the change in axial location, while no change occurs in the first alignment teeth signal. Summation of the axial teeth signal and first alignment teeth signal provides an indication of the axial location that is not affected by axial alignment changes.

Axial alignment in the horizontal plane is determined from monitoring of the phase lag of the first alignment teeth signal with respect to the phase of the reference signal. Since the first alignment teeth 108 and the reference teeth 110 are parallel to the axis of rotation 52, changes in axial location do not affect the accuracy of the axial alignment determination. Sensors 16 positioned in a horizontal plane perform the same task as the sensors in the vertical plane and are positioned at a 90° offset from the vertically positioned sensors 16 to determine axial location and axial alignment in the vertical plane.

The driven end assembly 104 includes a second alignment assembly 122 similar in configuration to the first alignment assembly 106. A second alignment wheel 116 of the second alignment assembly 122 has second alignment teeth 118 and second reference teeth 120 in a configuration similar to the first alignment teeth 108 and the first reference teeth 110.

The sensors 16 in the monitoring apparatus 100 are positioned to produce one signal for each of the horizontal axial location, axial alignment and reference and one signal for each of vertical axial location, axial alignment and reference. These six signals are produced from the detection of three sets of teeth at two different locations. This is in distinction of the apparatus 10 in the first embodiment that produces two signals for each of horizontal axial location/axial alignment and vertical axial location/axial alignment from the detection of one set of teeth 30 at four different locations.

Derivation of torque, axial alignment, axial location and axial vibration is performed by the processing system 300, shown in FIG. 10, in communication with the sensors 16.

Figure 7:
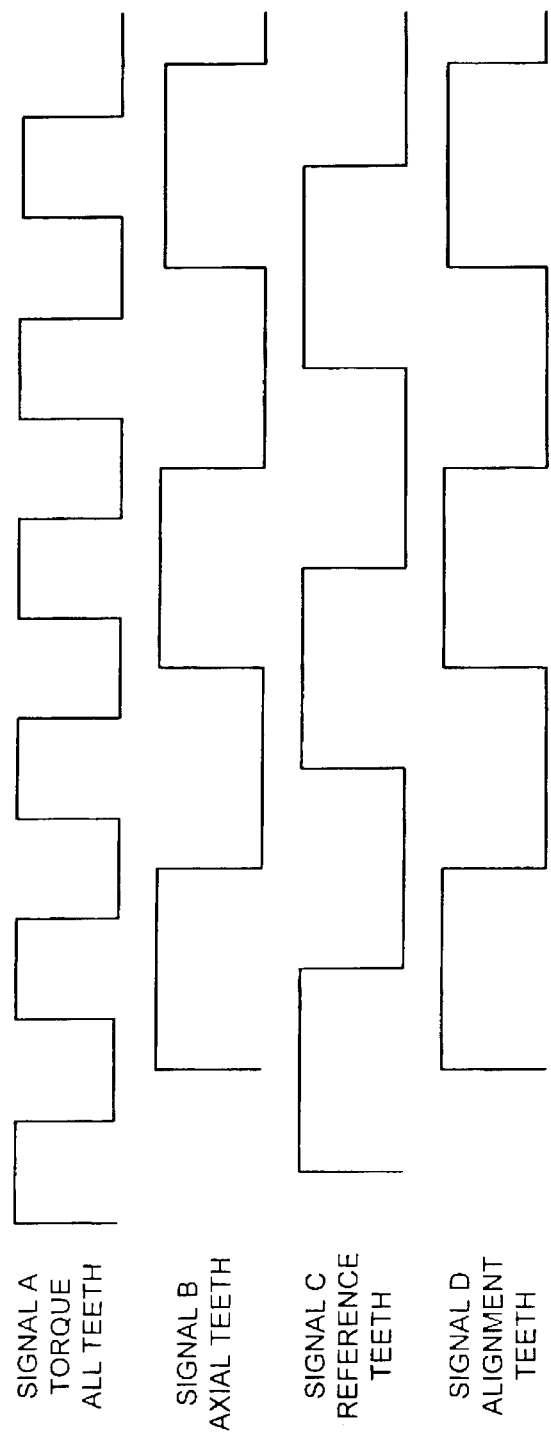
FIG. 7 is a timing diagram of detection and monitoring signals of the monitoring apparatus of FIG. 6.

FIG. 7 illustrates derivation of various characteristics of the shafts from measurements obtained by the sensors 16 in the apparatus 100 of FIG. 6. Detection of torque in the apparatus 100 is the same as torque detection in the apparatus 10 in FIG. 1A. While the apparatus 10 of the first embodiment used the torque signal as a reference signal, the apparatus 100 of the second embodiment produces a reference signal by detection of the first reference teeth 110.

Similar to the signals produced for the apparatus 10 of the first embodiment, sensors 16 over the torque teeth 22, 26, first reference teeth 110, the first alignment teeth 108 and the axial teeth 112 produce signals A, B, C, and D, respectively. Detection of the first reference teeth 110 produces a signal C. Detection of the first alignment teeth 108 and the axial teeth 112 produces signals D and B, respectively, having the same period as signal C only being offset therefrom. When the shaft 36 has a neutral alignment there is a 18° phase difference between signal C and signal D. When the shaft 36 has a neutral axial location there is a 18° phase difference between signal C and signal B. As with the detection of the first alignment teeth 30 from the first embodiment, changes in axial location and displacement will produce a change in the time between detection of the reference teeth 110 versus either the first alignment teeth 108 or the axial teeth 112 while the time between detection of successive teeth 108, 110,112 of the same type remains constant.

Axial location is determined from the difference between signal C and signal B plus the difference between signal C and signal D. Changes in signals B and D due to changes in alignment of the shaft 36 are equal and opposite. Summation of the differences between the reference signal (signal C) and signals B and D removes the effects of alignment in the determination of axial location. Axial alignment is determined from the difference between signal C and signal D.

Detection of the signal from the second alignment teeth 118 and the second reference teeth 120 provides signals similar to signals C and D, respectively. The difference between the signals provided by detection of the second reference teeth 120 and the second alignment teeth 118 indicates axial alignment at the driven end of the shaft 36. Axial alignment considered from both the drive end and the driven end provide a more complete picture of the axial alignment of the entire shaft 36 with respect to the driving force and load shafts.

Figure 8:
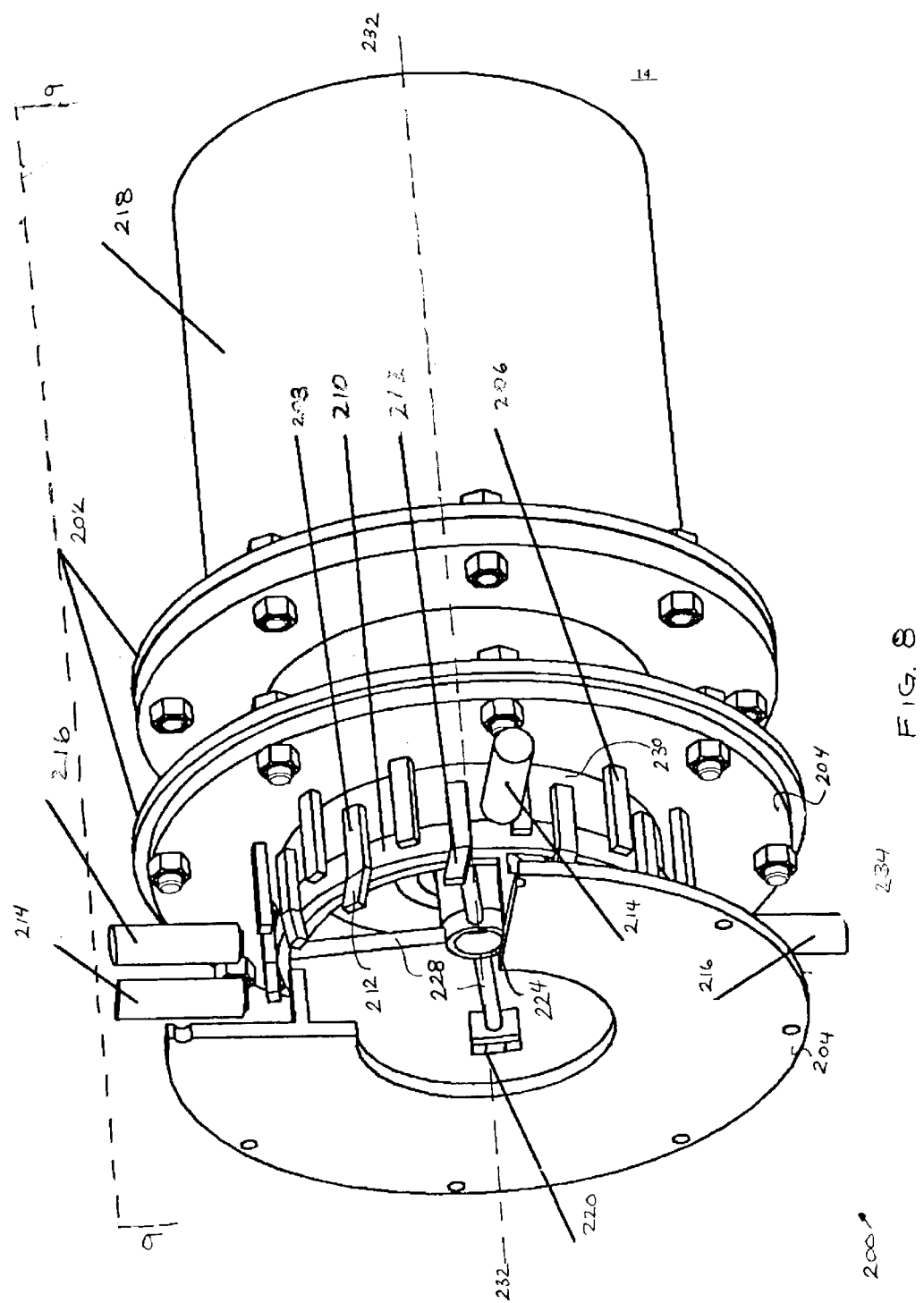
FIG. 8 is an isometric view of a monitoring apparatus located on a shaft in accordance with a third embodiment of the present invention.
Figure 9:
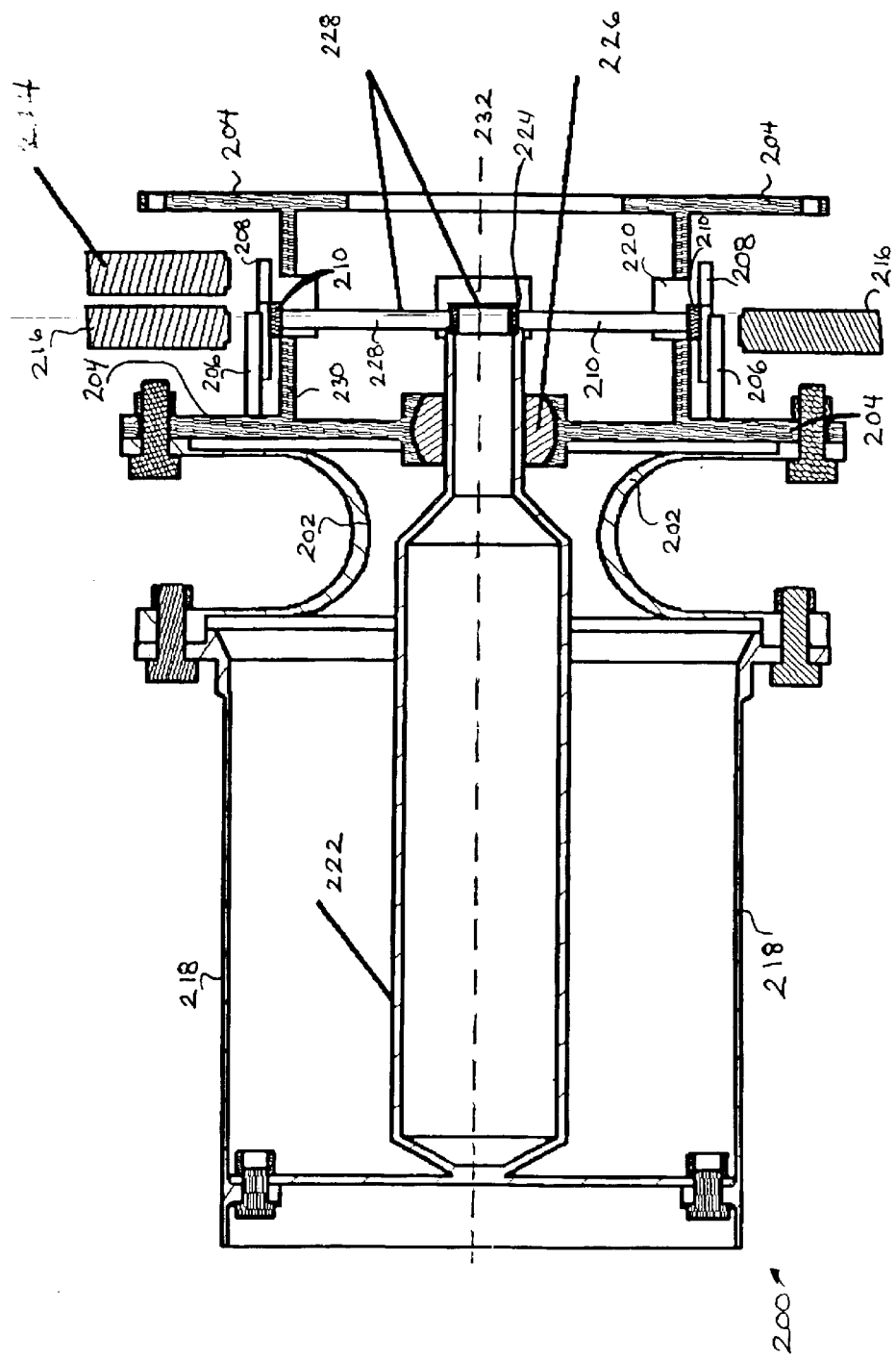
FIG. 9 is a cross section of the monitoring apparatus of FIG. 8 taken along line 9—9.

FIGS. 8 and 9 show a monitoring apparatus 200 according to a third embodiment of the present invention. A shaft 218 is connected to a driving force (not shown) via a flexible coupling 202 and a flange 204 from a torque assembly 234. The coupling 202 is connected to the shaft 218 on one end and to the flange 204 on the other end. The flange 204 is connected to the driving force on the end opposite the coupling 202.

A reference sleeve 222 is positioned inside the shaft 218 and attached to the shaft 218 at a predetermined position. One end of the sleeve 222 is attached to the shaft 218. The reference sleeve 222 is of a sufficient length to isolate a section of the shaft 218 to produce a detectable level of rotational deflection of the shaft 218 over the anticipated load on the shaft. The opposite end of the sleeve 222 is attached to an inner wheel 224 of the flange 204 via a bearing 226. The inner wheel 224 is connected to the torque/alignment wheel 210 via spokes 228 that extend through slots 220 in the flange 204.

Attached to the flange 204 are reference teeth 206 positioned parallel to an axis of rotation 232 for the shaft 218 and extending over an axial surface 230 of the flange 204 and over a portion of a torque/alignment wheel 210. The torque/alignment wheel 210 is positioned over a portion of the flange 204 and has on its surface torque teeth 208 parallel to the axis of rotation 232 and location teeth 212 oriented at an angle to the axis of rotation 232 on the surface. The torque teeth 208 on the torque alignment wheel 210 are positioned approximately half way between sequential reference teeth 206. The torque teeth 208 extend from the torque/alignment wheel 210 over a portion of the axial surface 230. The reference teeth 206 and the torque teeth 208 are evenly spaced so that detection of a change in spacing between the teeth 206,208 provides an indication of rotational deflection of the shaft 218 due to applied torque. The flange 204 with the axial surface 230 and reference teeth 206 in conjunction with the torque/alignment wheel 210 and torque teeth 208 function in a manner similar to the torque assembly 18 of the first and second embodiments of the present invention.

The shaft 218 rotationally deflects as torque is applied thereto. The torque produces a rotational displacement in the shaft 218 that is seen in the torque teeth 208. The shaft 218 causes rotation of the sleeve 222 therein which causes rotation of the torque/alignment wheel 210 and the torque teeth 208 via the spokes 228. The reference teeth 206 and the torque teeth 208 appear to be evenly spaced when the torque transmitted through the torque/alignment wheel 210 is small. As the torque increases the spacing between the reference teeth 206 and the torque teeth 208 becomes increasingly more uneven. Detection of the reference teeth 206 and the torque teeth 208 produces a signal having a relationship of time between subsequent tooth 206,208 detections that corresponds to the change in spacing between the teeth 206,208. Summation of signals generated by sensors 216 mounted oppositely around the wheel 210 reduces errors produced by axial misalignment since such errors create equal and opposite changes on opposite sides of the wheel 210.

A sensor 216 for the detection of the torque teeth 208 and the reference teeth 206 is positioned over the interface between the axial surface 230 and the torque/alignment wheel 210 crossed by the torque teeth 208 and the reference teeth 206. The signal obtained from this sensor 216 indicates torque in a manner similar to torque indication from the first and second embodiments of the present invention. Torque signals obtained from diametrically opposed sensors 216 may be summed to obtain a torque measurement with axial alignment errors removed therefrom. A difference of the diametrically opposed torque signals may be used to obtain an indication of axial alignment.

The torque/alignment wheel 210 also has location teeth 212 attached thereto on the opposite side from the reference teeth 206. The location teeth 212 are parallel to each other and are positioned at an angle to the axis of rotation 232. Sensors 214 for the detection of the location teeth 212 are positioned in a plane to align with the center of the location teeth 212. Signals obtained from the sensors 214 are used for derivation of axial location. Axial location may be obtained with the torque signal as a reference signal as in the first and second embodiments of the present invention.

Derivation of torque, axial alignment, axial location and axial vibration is performed by the processing system 300, shown in FIG. 10, in communication with the sensors 214,216.

Figure 11:
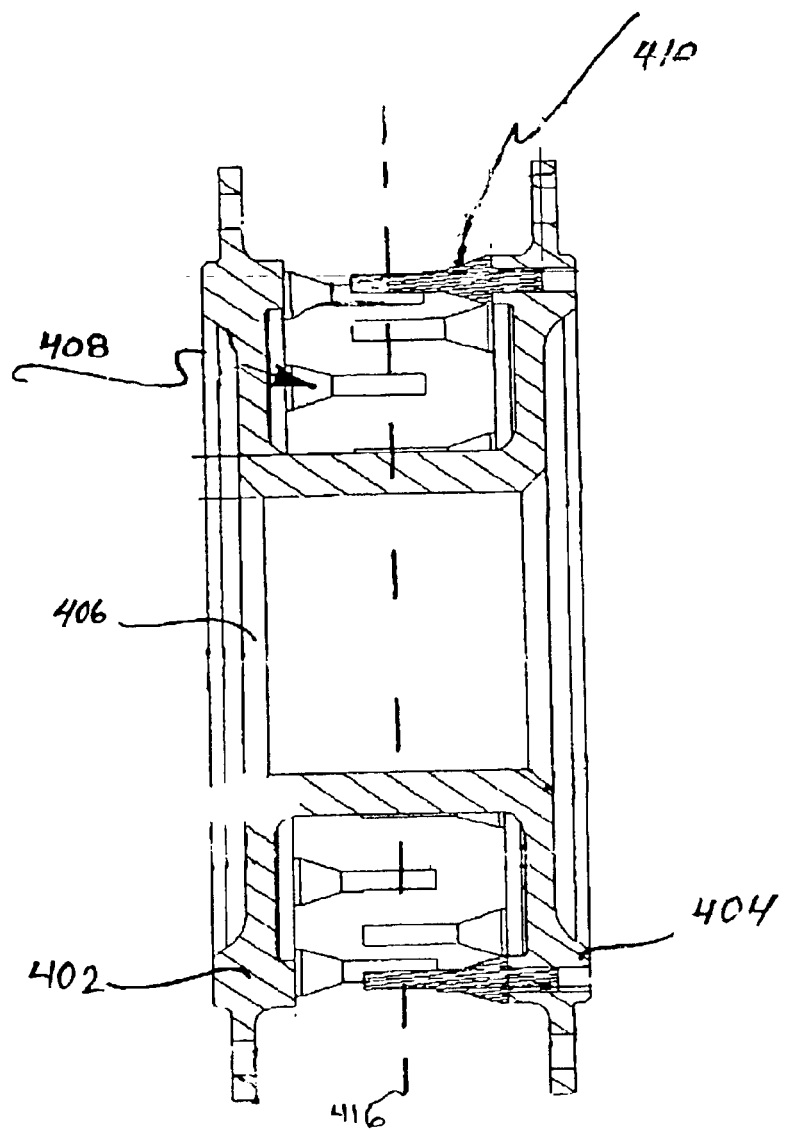
FIG. 11 is a side view of the torque assembly of FIG. 10.

FIGS. 10 and 11 show a fourth embodiment of a torque assembly 400 to be attached between two rotating shafts (not shown) in a manner similar to the torque assembly of the first, second and third embodiments. The torque assembly 400 is configured in combination with a flanged tubular shaft element 402,404,406 that may be, for example, a coupling connecting two shafts. The flanged tubular shaft element 402,404,406 has two flanges 402,404 to which rotatable shafts may be connected for coupling. The two flanges 402,404 are connected via a central hollow tube 406 extending coaxial to the two flanges 402,404.

Reference teeth 410 and measurement teeth 408 are attached to the inside of the flanges 402,404 and extend over the hollow tube 406. The flanges 402,404 and the tube 406 rotationally deflect when torque is applied, thus producing a rotational displacement of the teeth 408,410. The teeth 408,410 are made detectable to a sensor 412 positioned along the axis of deflection 416 and over the teeth 408,410 in close proximity thereto. For example, the teeth 408,410 may be composed of a magnetically detectable material and the sensor 416 may detect magnetic flux from passage of the teeth 408,410 and produce an electrical signal in response to the detection. The teeth 408,410 may additionally have a flat portion 414 on the outer surface thereof to assist in detection.

As with the other embodiments, the time between subsequent detections of a reference tooth 410 and a measurement tooth 408 indicates rotational displacement.

A second sensor (not shown) may be positioned on the opposite side of the flanged tubular shaft element 402,404, 406 from the first sensor 416. The output from the second sensor and the first sensor 416 can be averaged to remove the effects of shaft bending from the torque signal.

The torque assembly 400 of the third embodiment is flexibly bendable but offers manufacturing simplicity.

Figure 12:
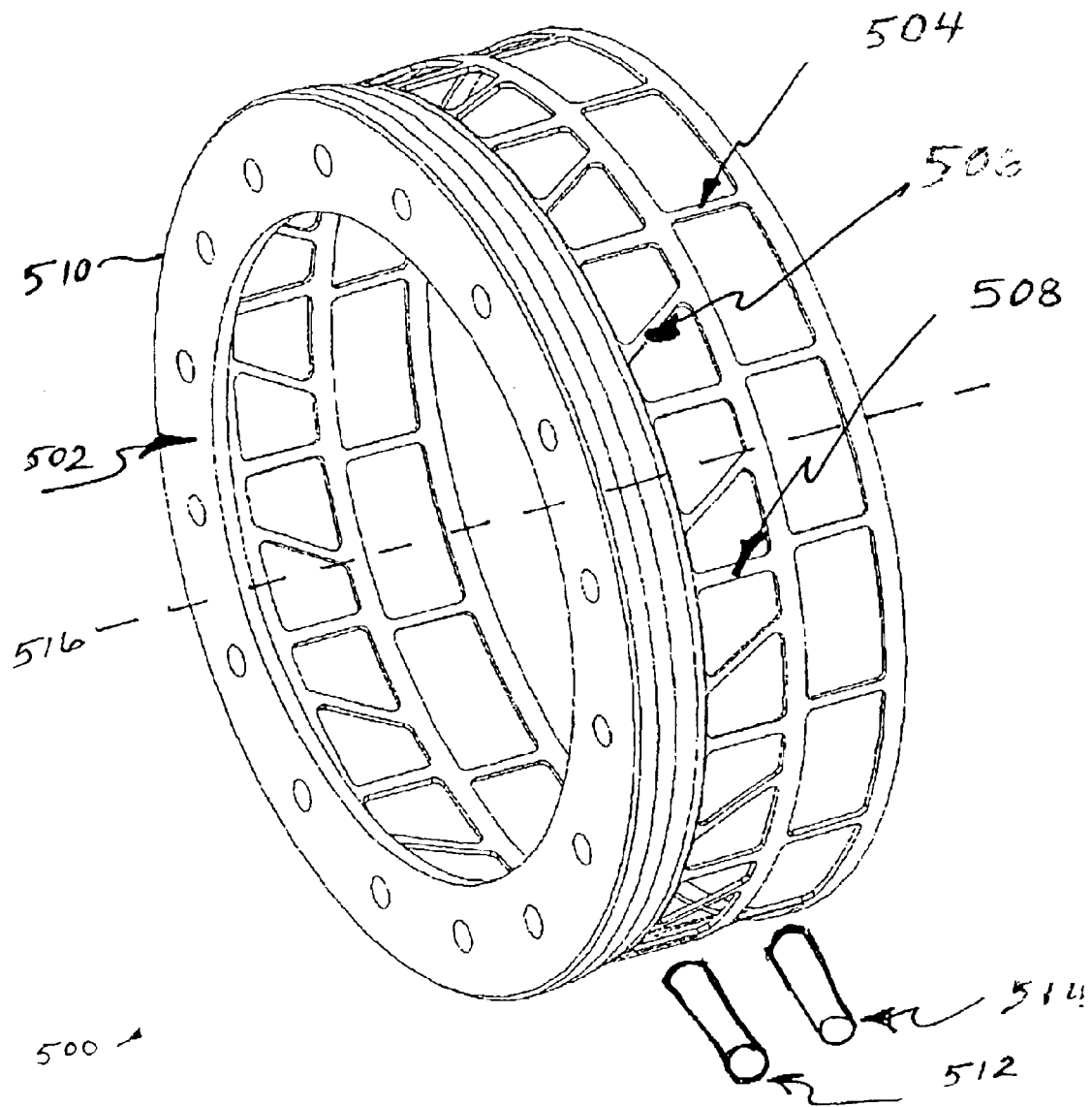
FIG. 12 is an isometric view of an alignment assembly in accordance with a fourth embodiment of the present invention.
Figure 13:
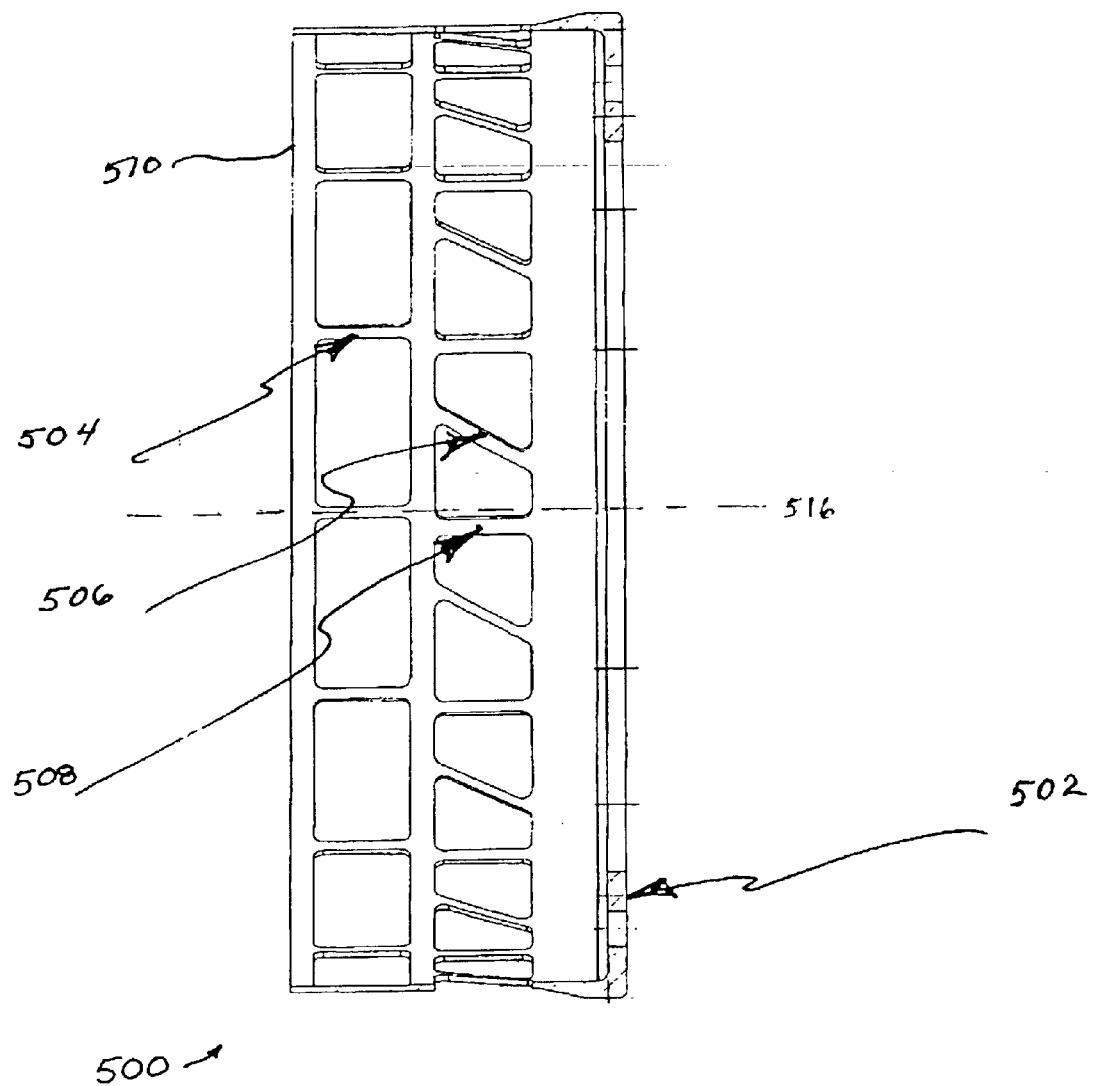
FIG. 13 is a side view of the alignment assembly of FIG. 12.

FIGS. 12 and 13 show a fourth embodiment of an alignment assembly 500 to be attached between two rotating shafts (not shown) in a manner similar to the first alignment assembly 28,106 of the first and second embodiments. The alignment assembly 500 is a cylinder 510 having an axial surface flange 502 that is connected to the rotating shaft in the vicinity of a flexible coupling.

The axially extending surface of the alignment assembly contains reference teeth 504, alignment teeth 508 and axial location teeth 506. The teeth 504,506,508 in the present embodiment are portions of the axially extending surface whereas the teeth 22,26,30,34,108,110,112,118,120,206, 208,212 in the first, second and third embodiments are elements that arc attached to an axially extending surface of the wheels 20,24,54,56,114,116,210,230. The teeth 504,506, 508 are isolated from the entire axially extending surface by removal of material surrounding the teeth 504,506,508, thus forming a lattice-like pattern on the axially extending surface. In such a case the cylinder 510 may be composed of a magnetically permeable material.

As with the various other wheels 20,24,54,56,114,116, 210,230 of the other embodiments, sensors 512,514 are positioned in close enough proximity to the teeth 504,506, 508 to detect their passage. The sensors 512,514 are positioned together in a horizontal plane and are parallel to an axis of rotation 516 of the shafts to detect the alignment teeth 508 and axial location teeth 506, and the reference teeth 504, respectively. A second set of sensors (not shown) are located together in a vertical plane and are parallel to the axis of rotation 516. The sensors 512,514 in each plane detect axial alignment and location for their respective plane.

As with the other embodiments the timing relationship between detection of the reference teeth 504 and the alignment teeth 508 indicates the alignment of the shaft in the plane in which the detecting sensors 512,514 are located. The timing relationship between detection of the reference teeth 504 and the axial location teeth 506 indicates the axial location of the shaft in the plane in which the detecting sensors 512,514 are located.

The various torque measurement systems 10, 100, 200, 400 that use torsional deflection as the basis for measurement may also include a means for temperature detection (not shown) of the torque assembly 18, 234, 400. Young's Modulus varies with temperature, depending on the material and temperatures to which the torque assembly 18, 234, 400 is exposed. As the torque assembly 18, 234, 400 temperature increases, the torque assembly 18, 234, 400 rotationally deflects to a greater amount at a given torque load. The opposite is true when the torque assembly 18, 234, 400 temperature decreases. Consequently, a temperature sensitive device, such as a resistance temperature device, infrared surface temperature sensor, or other device, is placed in the vicinity of the torque assembly 18, 234, 400 to derive a compensation signal for processing of the signal obtained from the torque assembly 18, 234, 400. The temperature sensor is housed to create a thermal tracking of the torque assembly 18, 234, 400 and the temperature sensor over time, i.e., the temperature sensor has a thermal inertia similar to the torsion member to assure the temperature compensation remains appropriate as the torque assembly 18, 234, 400 temperature changes during operation. While the temperature sensor is often located within the housing of the a sensor 216, 412 for torque, it may also be located in a separate housing to facilitate a more accurate thermal tracking function.

Figure 14:
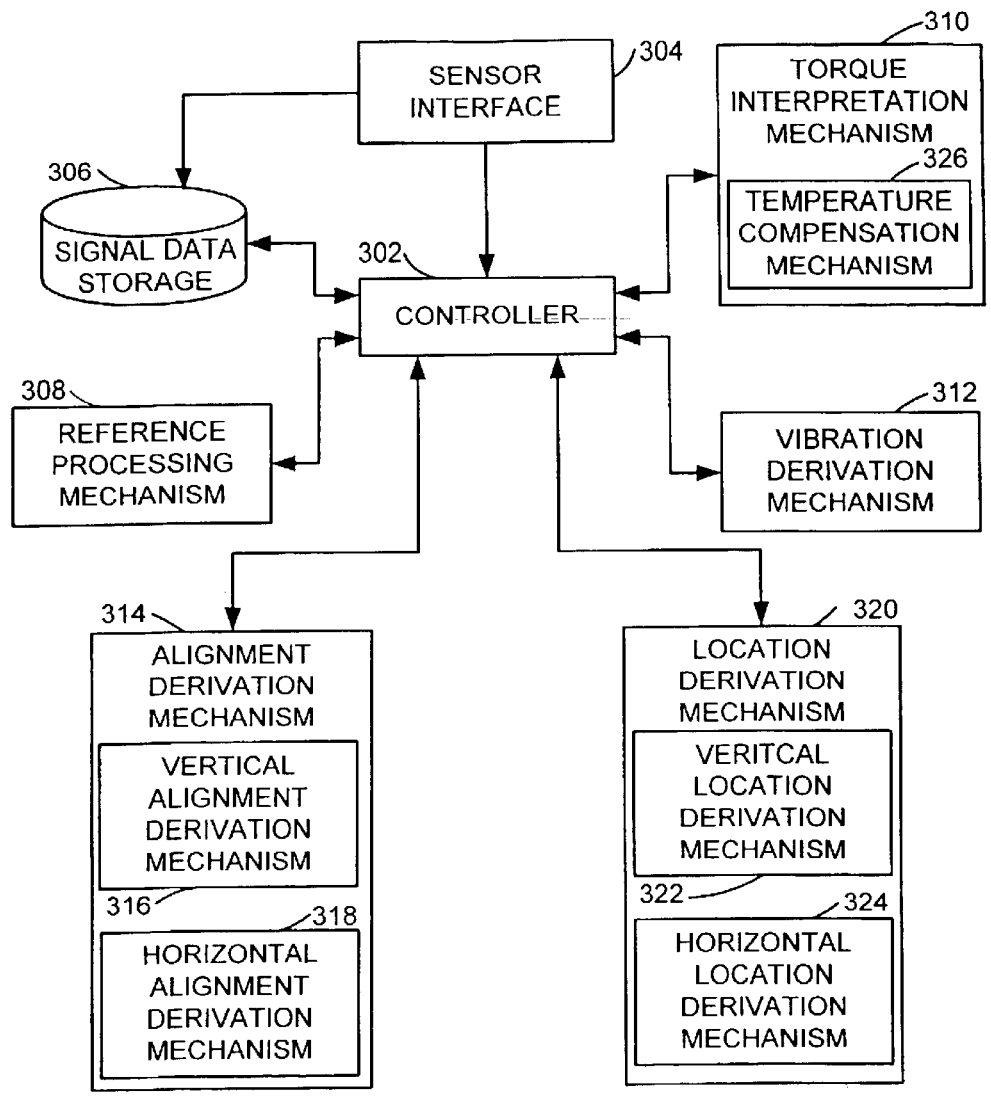
FIG. 14 is a block diagram of a processing system for processing the detection and monitoring signals of the monitoring apparatus in FIGS. 1A, 6 and 8 to 13.

FIG. 14 shows the processing system 300 of the monitoring apparatus 10, 100, 200, 400, 500 from FIGS. 1A, 6, 8 to 13. A sensor interface 304 acts as an interface between the processing system 300 and the sensors 16,214,216,412, 512,514 to receive signals therefrom. The signals received from the sensors 16,214,216,412,512,514 are stored in a signal data storage 306 and provided to a controller 302. The signal data storage 306 retains signals from all sensors 16,214,216,412,512,514 as well as any signals or information derived from the signals, including temperature data used for torque measurement compensation.

The controller 302 manages the processing of the received signals to provide axial alignment, axial location, axial vibration and torque information for the rotating shafts 36,218 being monitored by the monitoring apparatus 10,100, 200,400,500. The controller 302 supplies the torque signal to a torque interpretation mechanism 310 for analysis.

The torque interpretation mechanism 310 assesses the relationship of time during which a tooth is detected to the period of the one full cycle of tooth detection and space between teeth. The duration of each "high" relative to the period of the signal is related to the rotational deflection of the shaft 36,218 and therefore is representative of the torque on the shaft 36,218. The torque interpretation mechanism 310 provides an indication to the controller 302 of the amount of torque detected from the torque signal.

The torque interpretation mechanism 310 includes a temperature compensation mechanism 326 for considering the temperature sensed in close proximity to the torque assembly 18, 234, 400 when determining an indication for torque. The torque interpretation mechanism 310 modifies the torque signal to account for temperature variations.

The controller 302 assesses if a separate reference signal is provided (e.g. third embodiment). If a separate reference signal has not been provided then the torque signal is provided to a reference processing mechanism 308.

The reference processing mechanism 308 adapts the torque signal according to known characteristics of the torque assembly 18,204,230,210 and the configuration of the other teeth 30,34,210. The period of the torque signal is adapted to have a period that conforms to the period of the signal(s) from the other teeth 30,34,310. For example, the reference signal is generated by detection of only the reference teeth 26,206,110,504 having the same number of teeth as do the alignment wheel. The reference signal is used as a base line against which the other signals may be compared with regards to timing of the detection of the other teeth 30,34,210,108,112,120,506,508.

Once a reference signal has been obtained it is supplied to the controller 302 where it is stored in the signal data storage 306 and then passed to various mechanisms for derivation of various measurements. An alignment derivation mechanism 314 derives axial alignment for the shaft 36,218 from the reference signal and other signals depending on the configuration of the monitoring apparatus 10,100,200,400,500. A location derivation mechanism 320 derives axial location for the shaft from the reference signal and other signals depending on the configuration of the monitoring apparatus 10,100,200,400,500. A vibration derivation mechanism 312 obtains an indication of axial vibration for the shaft based on the axial location information from the location derivation mechanism 320.

The alignment derivation mechanism 314 obtains the reference signal and other signals depending on the configuration of the monitoring apparatus 10,100,200,400,500. For example, the alignment derivation mechanism 314 obtains signals from detection of the first and second alignment teeth 30,34,108,120,508, and where appropriate from the reference teeth 26,110,504, for the first and second embodiments and from the detection of the torque teeth 208 in the third embodiment. These other signals may be obtained from horizontal sensors 16,214,216,412,512,514 or vertical sensors 16,214,216,412,512,514. A vertical alignment derivation mechanism 316 derives vertical axial alignment information from signals obtained from vertical sensors 16,214,216,412,512,514 while a horizontal alignment derivation mechanism 318 derives horizontal axial alignment information from signals obtained from horizontal sensors 16,214,216,412,512,514. Both the vertical alignment derivation mechanism 316 and the horizontal alignment derivation mechanism 318 determine a difference between the reference signal and the signals from their respective sensors. The vertical alignment derivation mechanism 316 and the horizontal alignment derivation mechanism 318 measure the difference between the signals from diametrically opposed sensors that have been differentiated with the reference signal to form the signal indicating the alignment for that plane.

The location derivation mechanism 320 obtains the reference signal and other signals depending on the configuration of the monitoring apparatus 10,100,200,400,500 from the controller 302. For example, the location derivation mechanism 320 obtains a signal from detection of the first alignment teeth 30 in the first embodiment, signals from detection of the first alignment teeth 108 and the axial teeth 112 in the second embodiment, a signal from detection of the location teeth 212 in the third embodiment, a signal from detection of the alignment teeth 508 and axial location teeth 506 in the fourth embodiment.

The other signals may be obtained from vertically or horizontally configured sensors 16,214,216,412,512,514. A vertical location derivation mechanism 322 derives vertical axial location from signals obtained from vertical sensors 16,214,216,412,512,514 while a horizontal location derivation mechanism 324 derives horizontal axial location information from signals obtained from vertical sensors 16,214, 216,412,512,514. Both the vertical location derivation mechanism 322 and the horizontal location derivation mechanism 324 determine a difference between the reference signal and the signals from their respective sensors. The vertical location derivation mechanism 322 and the horizontal location derivation mechanism 324 add the signals from diametrically opposed sensors that have been differenced with the reference signal to form the signal indicating the alignment for that direction.

The vibration derivation mechanism 312 obtains the vertical and horizontal location information from the signal data storage 306. Vibration information is derived by examining the location information over time.

Embodiments of the processing system 300 can be implemented as a computer program product for use with a computer system. Such implementation may include a series of computer instructions fixed either on a tangible medium, such as a computer readable medium (e.g. a diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e g. shrink wrapped software), preloaded with a computer system (e.g., on system ROM or fixed disk), or distributed from a server over the network (e.g., the Internet or World Wide Web). Some embodiments of the processing system 300 may be implemented as a combination of both software (e.g. a computer program product) and hardware (termed mechanisms). Still other embodiments of the processing system 300 may be implemented as entirely hardware, or entirely software (e.g. a computer program product).

A number of statistical or actual representations of the measured signals may be provided as output from the processing system 300. For example, the output may be provided in instantaneous form, in phase-averaged form, as maximum or minimum measurements, as a range occurring in a given time period or a measure of statistics deviation. Those skilled in the art will appreciate that numerous conventional methods of analysis may be applied to the measured signals and output may be provided depending on the desired purpose of the monitoring. For example, detection of torque at couplings on both ends of a shaft may be used to indicate a coupling yield across one of the couplings that may be used to predict coupling failure.

It is apparent to one skilled in the art that numerous modifications and departures from the specific embodiments described herein may be made without departing from the spirit and scope of the invention.

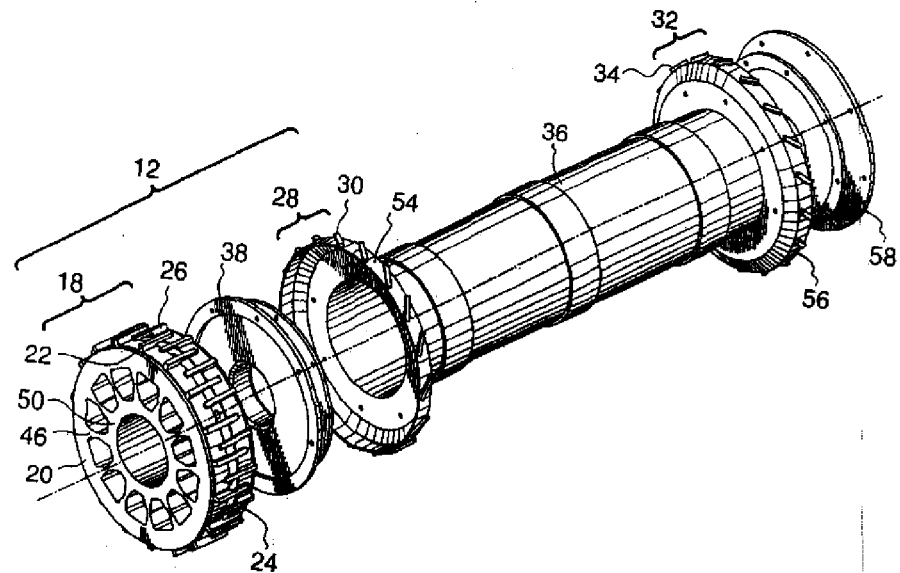

What is claimed is:

1. An apparatus for obtaining an indication of at least one of torque, axial alignment and axial location for a shaft rotating about an axis of rotation, said apparatus comprising:

a first set of detectable elements operably connected to the shaft and positioned parallel to the axis of rotation;

a second set of detectable elements parallel to the axis of rotation and interlaced in a sensing plane with said first set of detectable elements, said second set of detectable elements having a variable relative position with respect to said first set of detectable elements;

a third set of detectable elements positioned laterally to said first set of detectable elements and said second set of detectable elements in an alignment plane parallel to the sensing plane, said third set of detectable elements being positioned at an offset angle to the axis of rotation; and a plurality of sensors positioned to detect passage of said first set of detectable elements, said second set of detectable elements and said third set of detectable elements, each of said plurality of sensors producing a signal in response to detection of passage of detectable elements;

wherein relationships for signals produced from detection of said first, second and third sets of detectable elements with respect to a reference signal provides an indication of at least one of torque, axial alignment and axial location.

2. The apparatus according to claim 1 wherein the relative position of said second set of detectable elements varies in response to torque and wherein one of said plurality of sensors is positioned in the sensing plane for detection of said first set of detectable elements and said second set of detectable elements, a timing relationship between detection of said first set of detectable elements and said second set of detectable elements corresponding to torque.

3. The apparatus according to claim 2 further including:
a spoke assembly having a first outer surface to which said first set of detectable elements are connected, a second outer surface to which said second set of detectable elements are connected and an inner wheel to which said first outer surface and said second outer surface are rotatably deflectively connected, said inner wheel being operably connected to the shaft for rotation therewith, said inner wheel, said first outer surface and said second outer surface being concentric with the axis of rotation.

4. The apparatus according to claim 2 further including:
a flexible coupling operably connected to the shaft, said first set of detectable elements being connected to a first surface of said flexible coupling and said second set of detectable elements being connected to a second surface of said flexible coupling.

5. The apparatus according to claim 2 wherein the shaft is connected to a flexible coupling, said second set of detectable elements being connected to the flexible coupling for rotation therewith, the apparatus further including:
a first surface operably connected to the shaft for rotation therewith, said first set of detectable elements being connected to said first surface.

6. The apparatus according to claim 5 further including:
a reference tube positioned interiorly to the shaft, said reference tube having a first end operably connected to the shaft and a second end operably connected to said first surface.

7. The apparatus according to claim 1 wherein said third set of detectable elements rotates about said axis of rotation separately from at least one of said first set of detectable elements and said second set of detectable elements.

8. The apparatus according to claim 1 wherein the shaft is connected to a flexible coupling having an axis of deflection, the axis of deflection being collinear with the alignment plane.

9. The apparatus according to claim 1 wherein said reference signal is generated from detection of one of said first set of detectable elements or said second set of detectable elements, and wherein a relationship of the signal obtained from detection of the third set of detectable elements referenced to said reference signal provides an indication of axial location of the shaft.

10. The apparatus according to claim 9 wherein a pair of sensors from said plurality of sensors are diametrically opposed and are located in a sensing axis in the sensing plane around said first set of detectable elements and said second set of detectable elements, and wherein a relationship between the signals obtained from said pair of sensors provides an indication of axial alignment of the shaft.

11. The apparatus according to claim 1 wherein a pair of sensors from said plurality of sensors are diametrically opposed about said third set of detectable elements, a signal from one of said pair of sensors being the reference signal and wherein a relationship of the signal obtained from detection of the third set of detectable elements reference to said reference signal provides an indication of axial location of the shaft.

12. The apparatus according to claim 7 further including:
a fourth set of detectable elements parallel to said axis of rotation in a reference plane parallel to the sensing plane and the alignment plane, said fourth set of detectable elements being lateral to and rotating with said third set of detectable elements, detection of said fourth set of detectable elements producing said reference signal.

13. The apparatus according to claim 12 further including:
a fifth set of detectable elements parallel to said axis of rotation, said fifth set of detectable elements being interspersed with said third set of detectable elements in said alignment plane,
wherein detection of passage of said fourth set of detectable elements generates the reference signal and wherein a signal generated by detection of passage of said third set of detectable elements and said fifth set of detectable elements referenced to said reference signal provides an indication of axial alignment and axial location.

14. The apparatus according to claim 1 further including:
a temperature compensation mechanism for sensing temperature in close proximity to said first set of detectable elements and said second set of detectable elements, the sensed temperature being considered with a signal obtained from detection of said first set of detectable elements and said second set of detectable elements when providing the indication of torque.

15. The apparatus according to claim 1 wherein each of first set of detectable elements, each of said second set of detectable elements and each of said third set of detectable elements is magnetically detectable and each of said plurality of transducers is of a variable reluctance type.

16. The apparatus according to claim 1 wherein each of first set of detectable elements, each of said second set of detectable elements and each of said third set of detectable elements is magnetically detectable and each of said plurality of transducers is of a magneto-optic type.

17. The apparatus according to claim 1 wherein each of first set of detectable elements, each of said second set of detectable elements and each of said third set of detectable elements is optically reflective and each of said plurality of transducers is of an optically detecting type.

18. The apparatus according to claim 1 further including:
an interpretation mechanism for deriving an indication for torque, axial alignment and axial location from signals produced by said plurality of detectable elements in response to detection of said first set of detectable elements, said second set of detectable elements, and said third set of detectable elements.

19. The apparatus according to claim 18 wherein said interpretation mechanism comprises:
a sensor interface for receiving signals from said plurality of sensors;
a controller for managing processing of received signals;
a torque interpretation mechanism for obtaining an indicator of torque for the shaft based on said received signals;

an alignment derivation mechanism for obtaining an indictor of axial alignment of the shaft based on said received signals; and a location derivation mechanism for obtaining an indicator of axial location of the shaft based on said received signals.

20. The apparatus according to claim 19 wherein said interpretation mechanism further includes:

a vibration derivation mechanism for obtaining an indictor of axial vibration of the shaft based on said indicator of axial location.

21. The apparatus according to claim 19 wherein said torque interpretation mechanism includes:

a temperature compensation mechanism for accounting for a temperature sensed in close proximity to said first set of detectable elements and said second set of detectable elements in the indication of torque obtained from detection of passage of said first set of detectable elements and said second set of detectable elements in said sensing plane.

* * * * *

UNITED STATES PATENT AND TRADEMARK OFFICE
CERTIFICATE OF CORRECTION

PATENT NO. : 6,782,766 B2
DATED : August 31, 2004
INVENTOR(S) : Parkinson

It is certified that error appears in the above-identified patent and that said Letters Patent is hereby corrected as shown below:

Title page,
The Title page should be deleted to appear as per attached page.

Drawings,
The sheets of drawings consisting of figures 1-14, should appear as per attached figures.

Signed and Sealed this

Twelfth Day of April, 2005

JON W. DUDAS
*Director of the United States Patent and Trademark Office*

(12) United States Patent
Parkinson

(10) Patent No.: US 6,782,766 B2
(45) Date of Patent: Aug. 31, 2004

(54) APPARATUS FOR DETECTING TORQUE, AXIAL POSITION AND AXIAL ALIGNMENT OF A ROTATING SHAFT

(75) Inventor: James R. Parkinson, Addison, VT (US)

(73) Assignee: GasTOPS Ltd., Ottawa (CA)

(*) Notice: Subject to any disclaimer, the term of this patent is extended or adjusted under 35 U.S.C. 154(b) by 108 days.

(21) Appl. No.: 10/242,613

(22) Filed: Sep. 13, 2002

(65) Prior Publication Data

US 2004/0050178 A1 Mar. 18, 2004

(51) Int. Cl.$^7$ .................................. G01L 3/02
(52) U.S. Cl. .................. 73/862.329; 73/862.328
(58) Field of Search ............... 73/862.325, 862.326, 73/862.327, 862.328, 862.329

(56) References Cited

U.S. PATENT DOCUMENTS

| | | | |
|---|---|---|---|
| 3,548,649 A | | 12/1970 | Parkinson |
| 3,940,979 A | * | 3/1976 | Ward et al. ............ 73/862.324 |
| 4,784,002 A | * | 11/1988 | Io .......................... 73/862.331 |
| 5,508,609 A | | 4/1996 | Parkinson et al. |
| 5,734,108 A | | 3/1998 | Walker et al. |
| 5,969,269 A | | 10/1999 | Munyon et al. |
| 6,295,879 B1 | * | 10/2001 | Miller et al. ............ 73/862.08 |

FOREIGN PATENT DOCUMENTS

WO    WO 99/05493    2/1999

OTHER PUBLICATIONS

Patent Abstracts of Japan, JP 10-089241, Sep. 28, 1999.

* cited by examiner

*Primary Examiner*—Max Noori
(74) *Attorney, Agent, or Firm*—Oblon, Spivak, McClelland, Maier & Neustadt, P.C.

(57) ABSTRACT

The present invention is an apparatus for obtaining an indication of torque, axial alignment and axial location for a shaft rotating about an axis of rotation. A first set of detectable elements are operably connected to the shaft and positioned parallel to the axis of rotation. A second set of detectable elements parallel to the axis of rotation are interlaced in a sensing plane with said first set of detectable elements. The second set of detectable elements have a variable relative position with respect to the first set of detectable elements. A third set of detectable elements are positioned laterally to the first set of detectable elements and the second set of detectable elements in an alignment plane parallel to the sensing plane. The third set of detectable elements are positioned at an offset angle to the axis of rotation. A plurality of sensors are positioned to detect passage of the first set of detectable elements, the second set of detectable elements and the third set of detectable elements, with each of the sensors producing a signal in response to detection of detectable elements. Relationships for signals produced from detection of the first, second and third sets of detectable elements with respect to a reference signal produced by detection of detectable elements in a plane separate from the alignment plane provides an indication of torque, axial alignment and axial location.

21 Claims, 14 Drawing Sheets